(12) United States Patent
Steinmann et al.

(10) Patent No.: US 6,583,245 B1
(45) Date of Patent: Jun. 24, 2003

(54) POLYMERIC STABILIZERS HAVING LOW POLYDISPERSITY

(75) Inventors: Alfred Steinmann, Les Russilles (CH); Michael Roth, Lautertal (DE); Werner Stauffer, Fribourg (CH); Peter Nesvadba, Marly (CH); Andreas Mühlebach, Frick (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/868,762

(22) PCT Filed: Dec. 14, 1999

(86) PCT No.: PCT/EP99/09878

§ 371 (c)(1),
(2), (4) Date: Jun. 21, 2001

(87) PCT Pub. No.: WO00/39209

PCT Pub. Date: Jul. 6, 2000

(51) Int. Cl.⁷ .................................................. C08F 4/04
(52) U.S. Cl. ..................... 526/218.1; 526/213; 526/217; 526/220; 526/318.4; 526/263; 526/262; 526/259; 526/265; 546/186
(58) Field of Search ................................ 526/263, 259, 526/262, 265, 220, 217, 213, 318.4, 218.1; 546/216, 186

(56) References Cited

U.S. PATENT DOCUMENTS

| | | | |
|---|---|---|---|
| 3,399,173 A | 8/1968 | Heller et al. | 260/47 |
| 4,294,949 A | 10/1981 | Karrer | 526/262 |
| 4,419,472 A | 12/1983 | Berner et al. | 524/102 |
| 4,785,063 A | 11/1988 | Slongo et al. | 526/259 |
| 5,541,274 A | 7/1996 | Steinmann | 526/263 |
| 5,637,714 A | 6/1997 | Steinmann | 546/242 |
| 5,677,388 A * | 10/1997 | Koster et al. | 525/267 |
| 5,807,937 A * | 9/1998 | Matyjaszewski et al. | 526/135 |
| 6,262,206 B1 | 7/2001 | Nesvadba et al. | 526/220 |
| 6,288,186 B1 * | 9/2001 | Matyjaszewski et al. | 526/217 |

FOREIGN PATENT DOCUMENTS

| | | |
|---|---|---|
| EP | 0434608 | 6/1991 |
| EP | 0962473 | 12/1999 |
| WO | 98/14416 | 4/1998 |
| WO | 99/03894 | 1/1999 |

\* cited by examiner

Primary Examiner—Tatyana Zalukaeva
(74) Attorney, Agent, or Firm—Tyler A. Stevenson

(57) ABSTRACT

The present invention relates to a polymerizable composition, comprising a) at least one compound of formula (I)

$$(RG)-A-(Stab) \qquad (I),$$

wherein (Stab) is a light stabilizer radical selected from the group consisting of sterically hindered amines, hydroxyphenyl-s-triazines, hydroxyphenyl-benzotriazols and o-hydroxy-benzophenones; A is a spacer group or a direct bond; and (RG) is a group containing at least one ethylenically unsaturated functional group; and either b1) a compound of formula (II)

$$Y—X \qquad (II),$$

wherein

X represents a group having at least one carbon atom and is such that the free radical derived from X is capable of initiating polymerization and Y represents a group being such that the free radical Y· derived from it forms a stable free radical; or b2) a stable free radical Y· and a free radical source from which a radical is formed capable of initiating polymerization, or b3) a compound of formula (III)

$$[In]_p—[Hal]_q \qquad (III)$$

and a catalytically effective amount of an oxidizable transition metal complex catalyst, wherein p represents a number greater than zero and defines the number of initiator fragments;

q represents a number greater than zero;

[In] represents a radically transferable atom or group capable of initiating polymerization and -[Hal] represents a leaving group; and optionally c) one or more ethylenically unsaturated monomers or oligomers different from those of formula (I). Further subjects of the invention are a polymerization process, the polymers, copolymers oligomers and cooligomers obtainable by this process and the use of the polymers, copolymers oligomers and cooligomers as heat or light stabilizers.

21 Claims, No Drawings

POLYMERIC STABILIZERS HAVING LOW POLYDISPERSITY

The present invention relates to radically polymerizable compositions, containing at least one light stabilizer with an ethylenically unsaturated group and to oligomers, polymers, cooligomers or copolymers having low polydispersity $M_w/M_n$, which are prepared by controlled radical polymerization from the polymerizable composition. Further aspects of the invention are a process for their preparation, their use as light or heat stabilizers for organic materials, particularly for synthetic polymers, paints, enamels or varnishes and the organic materials thus stabilized.

The stabilization of polymers with light/heat stabilizers such as 2,2,6,6-tetramethylpiperidine derivatives, hydroxy-benzophenones, hydroxy-benzotriazoles and hydroxy-phenyl-s-triazines is well known. It is also known to prepare and to use oligomeric or polymeric light stabilizers of the above mentioned classes for the stabilization of polymers. This is for example described in U.S. Pat. No. 4,294,949 and in U.S. Pat. No. 4,785,063. These polymeric light stabilizers are all prepared by a conventional free radical polymerization process.

However polymers or copolymers prepared by free radical polymerization processes inherently have broad molecular weight distributions or polydispersities which are generally higher than about four. One reason for this is that most of the free radical initiators have half lives that are relatively long, ranging from several minutes to many hours, and thus the polymeric chains are not all initiated at the same time and the initiators provide growing chains of various lengths at any time during the polymerization process.

Due to the broad molecular weight distribution and high molecular weights of the polymeric light stabilizers problems arise when they are incorporated into paints, coatings, or thermoplastic polymers. They cause for example a strong viscosity increase in paints and coatings, which is undesirable for the paint's application, in particular for the spray application of automotive coatings. In thermoplastic polymers compatibility problems may arise particularly with the high molecular weight portion of the polymeric light stabilizers. For these reasons polymeric light stabilizers having a low polydispersity are desirable for many applications.

The light stabilizers of the present invention are polymeric resin products having low polydispersity. The polymerization process proceeds with good monomer to polymer conversion efficiency, thus being also feasible on an industrial scale. In particular, this invention relates to stable free radical-mediated polymerization processes or to a, free radical initiated polymerization process by the ATRP (Atom Transfer Radical Polymerization) method which provide homopolymers, alternate-, gradient- or random copolymers, block copolymers or multiblock copolymers of different classes of light stabilizers.

The so made polymers or copolymers are highly compatible with thermoplastic polymers and thermosetting coatings. They are very efficient light/heat stabilizers either when used alone or in combination with other known stabilizers. Due to their low polydispersity they are easy to incorporate into other polymers, without for example significantly increasing their viscosity or melting properties.

One subject of the present invention is a polymerizable composition, comprising a) at least one compound of formula (I)

(RG)—A—(Stab)        (I), wherein (Stab) is a light stabilizer radical selected from the group consisting of sterically hindered amines, hydroxyphenyl-s-triazines, hydroxyphenyl-benzotriazols and o-hydroxy-benzophenones; A is a spacer group or a direct bond; and (RG) is a group containing at least one ethylenically unsaturated functional group; and either b1) a compound of formula (II)

Y—X        (II), wherein

X represents a group having at least one carbon atom and is such that the free radical derived from X is capable of initiating polymerization and Y represents a group being such that the free radical Y· derived from it forms a stable free radical; or b2) a stable free radical Y· and a free radical source from which a radical is formed capable of initiating polymerization; or b3) a compound of formula (III)

$[In]_p$—$[Hal]_q$        (III)

and a catalytically effective amount of an oxidizable transition metal complex catalyst, wherein p represents a number greater than zero and defines the number of initiator fragments;

q represents a number greater than zero;

[In] represents a radically transferable atom or group capable of initiating polymerization and -[Hal] represents a leaving group; and optionally c) one or more ethylenically unsaturated monomers or oligomers different from those of formula (I).

The sterically hindered amines are preferably selected from the class of piperidines, piperazinones, piperazindiones or morpholinones.

Preferably component a) of formula (I) is a compound of formulae (Ia), (Ib), (Ic), (Id), (Ie), (If), (Ig), (Ih), (Ii) or (Ij)

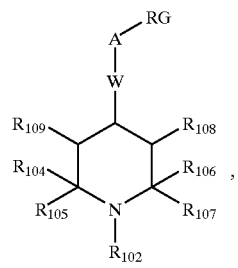

(Ia)

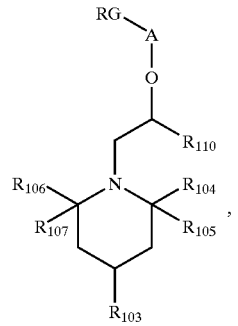

(Ib)

(Ic) 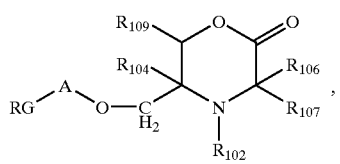
(Id) 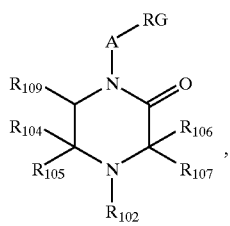
(Ie) 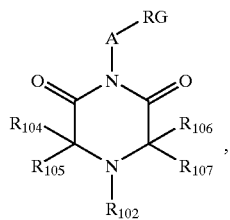
(If) 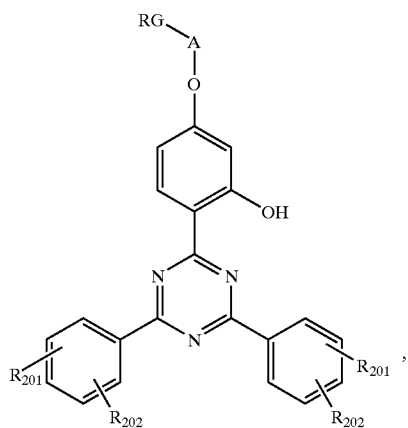
(Ig) 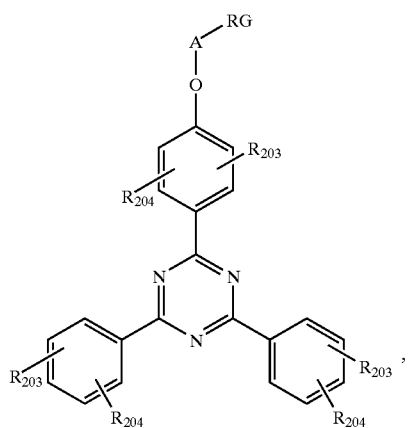
(Ih) 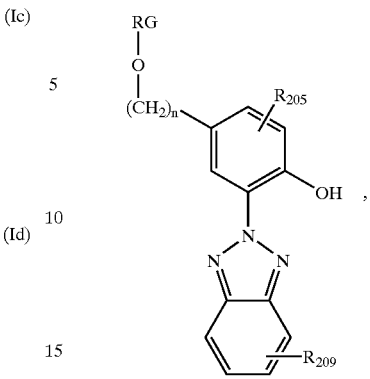
(Ii) 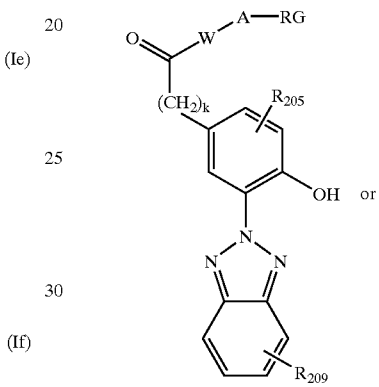
(Ij) 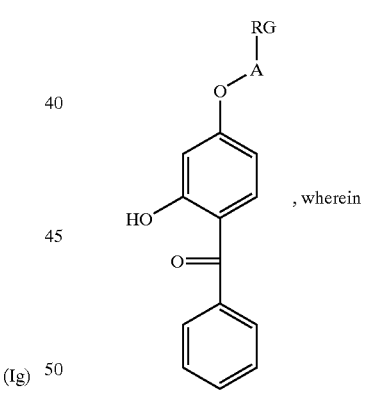, wherein
RG is a group 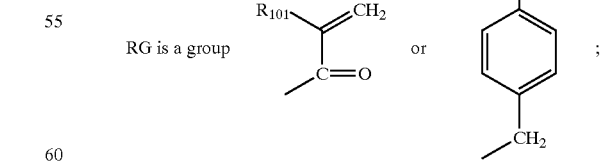;
W is O, or $NR_{110}$;
A is a direct bond, —$(C_2-C_{12})$alkylene-W—, —$(C_3-C_{12})$alkenylene-W—, —$CH_2$—$HC(OH)$—$CH_2$—W—, —$(C_3-C_{12})$alkinylene-W—, $(C_5-C_{12})$cycloalkylene-W—, —$(C_2-C_{12})$alkylene-W— interrupted by at least one oxygen or nitrogen atom or a group —$CH_2$—

CHR$_{110}$—W—, a group —CHR$_{111}$—COOP wherein P is —(CH$_2$—HCR$_{112}$)$_n$— or a group —CH$_2$—HC(OH)—CH$_2$—, wherein R$_{110}$, R$_{111}$, R$_{112}$ and n are as defined below;

R$_{110}$ is H or methyl R$_{102}$ is hydrogen, OH, C$_1$–C$_{18}$alkyl, C$_3$–C$_8$alkenyl, C$_3$–C$_8$alkynyl; C$_7$–C$_{12}$aralkyl, C$_1$–C$_{18}$alkanoyl, C$_3$–C$_{18}$alkenoyl, C$_1$–C$_{18}$alkanoyloxy, glycidyl, C$_1$–C$_{18}$alkoxy, C$_5$–C$_{12}$cycloalkyl, C$_5$–C$_{12}$cycloalkoxy or a group —CH$_2$CHR$_{110}$(OH);

R$_{103}$ is H, OH, NH$_2$, C$_1$–C$_{18}$alkoxy, C$_1$–C$_{18}$alkanoyloxy, C$_6$–C$_{18}$aryloyloxy, C$_1$–C$_{18}$alkanoylamino, C$_1$–C$_{18}$alkylamino, C$_1$–C$_{18}$alkylamino, benzyloxy or together with the linking carbon atom forms a C$_5$–C$_6$cycloalkyl radical or a C$_5$–C$_6$heterocycloalkyl radical containing one or two oxygen or nitrogen atoms;

R$_{104}$, R$_{105}$, R$_{106}$, R$_{107}$ are independently C$_1$–C$_8$alkyl or C$_5$–C$_{12}$cyloalkyl, or R$_{104}$ and R$_{105}$ and/or R$_{106}$ and R$_{107}$ together with the carbon atom to which they are attached form-a C$_5$–C$_{12}$cycloalkyl group;

R$_{108}$ and R$_{109}$ independently are H, C$_1$–C$_8$alkyl or phenyl;

R$_{110}$ is hydrogen, C$_1$–C$_{18}$alkyl or phenyl;

R$_{111}$ is hydrogen or C$_1$–C$_{12}$alkyl;

R$_{112}$ is hydrogen or methyl;

R$_{201}$ and R$_{202}$ are independently H, OH, CN, C$_1$–C$_{18}$alkyl, C$_1$–C$_{18}$alkoxy, halogen, C$_1$–C$_{18}$alkanoyl, C$_1$–C$_{18}$alkanoyloxy, C$_1$–C$_{18}$alkanoylamino, or phenyl which is unsubstituted or substituted with halogen, OH, CN, NO$_2$, C$_1$–C$_{18}$alkyl, C$_1$–C$_{18}$alkoxy or a group —O—CH$_2$—HC(OH)—CH$_2$—OR$_{206}$;

R$_{203}$ and R$_{204}$ are independently H, OH, CN, C$_1$–C$_{18}$alkyl, C$_1$–C$_{18}$alkoxy, halogen, C$_1$–C$_{18}$alkanoyl, C$_1$–C$_{18}$alkanoyloxy, C$_1$–C$_{18}$alkanoylamino, or phenyl which is unsubstituted or substituted with halogen, OH, CN, NO$_2$, C$_1$–C$_{18}$alkyl, C$_1$–C$_{18}$alkoxy or a group —O—CH$_2$—HC(OH)—CH$_2$—OR$_{206}$ with the proviso that at least one of both is OH;

R$_{205}$ is H, halogen, phenyl, C$_1$–C$_{18}$alkyl, C$_5$–C$_{12}$cycloalkyl, C$_7$–C$_{12}$aralkyl or a group —SR$_{208}$, —SO$_2$R$_{208}$, —COOR$_{208}$ or PO(OR$_{208}$)$_2$;

R$_{206}$ is C$_1$–C$_{18}$alkyl, C$_3$–C$_{18}$alkyl interrupted by at least one oxygen atom, phenyl which is unsubstituted or substituted with halogen, OH, CN, NO$_2$, C$_1$–C$_{18}$alkyl, C$_1$–C$_{18}$alkoxy, C$_5$–C$_6$cycloalkyl which is unsubstituted or substituted by C$_1$–C$_4$alkyl or a group —C(O)R$_{207}$;

R$_{207}$ C$_1$–C$_{18}$alkyl or phenyl which is unsubstituted or substituted with halogen, OH, CN, NO$_2$, C$_1$–C$_{18}$alkyl or C$_1$–C$_{18}$alkoxy;

R$_{208}$ is C$_1$–C$_{18}$alkyl, C$_5$–C$_6$cycloalkyl or phenyl;

R$_{209}$ is H, halogen, phenyl, C$_1$–C$_{18}$alkyl, C$_5$–C$_{12}$cycloalkyl, C$_7$–C$_{12}$aralkyl or a group —SR$_{208}$, —SO$_2$R$_{208}$, —COOR$_{208}$ or PO(OR$_{208}$)$_2$;

n is a number from 0 to 12, and k is a number from 0 to 12.

Preferably R$_{108}$ and R$_{109}$ are hydrogen and the other substituents are as defined above.

Preferably R$_{104}$, R$_{105}$, R$_{106}$ and R$_{107}$ are methyl and the other substituents are as defined above.

Preferably A is a direct bond, —(C$_2$–C$_6$)alkylene-W—, —(C$_2$–C$_{12}$)alkylene-W— interrupted by at least one oxygen or nitrogen atom or a group —CH$_2$—CHCH$_3$—W—.

W is preferably an oxygen atom.

R$_{102}$ is preferably hydrogen, C$_1$–C$_8$alkyl, allyl, benzyl, C$_1$–C$_8$alkanoy), C$_1$–C$_8$alkanoyloxy, C$_1$–C$_8$alkoxy or cyclohexyloxy.

Preferably R$_{103}$ is H, C$_1$–C$_8$alkoxy, C$_1$–C$_8$alkanoyloxy, benzyloxy, C$_1$–C$_8$alkylamino, C$_1$–C$_8$dialkylamino or C$_1$–C$_8$alkanoylamino.

R$_{201}$, R$_{202}$, R$_{203}$ and R$_{204}$ are independently H, C$_1$–C$_8$alkyl, OH, C$_1$–C$_8$alkoxy, phenyl or halogen, with the proviso that at least one of R$_{203}$ or R$_{204}$ is OH.

Preferably R$_{205}$ is hydrogen, halogen or C$_1$–C$_8$alkyl.

Preferably R$_{206}$ is C$_1$–C$_4$alkyl or phenyl.

R$_{207}$ is preferably C$_1$–C$_4$alkyl or phenyl which is unsubstituted or substituted with C$_1$–C$_{18}$alkoxy;

R$_{208}$ is pereferably C$_1$–C$_4$alkyl or phenyl;

Preferably n is a number from 2–6 and k is a number from 0–2.

Preferably the compound of formula (I) is a compound of formulae (Ia), (Ic), (Id), (If), (Ig), (Ii) or I(j), more preferably of formulae (Ia), (If), (Ig) or (Ii).

Preferred is a composition, wherein in the compound of formula (Ia), A is a direct bond, C$_2$–C$_6$alkylene or C$_2$–C$_6$alkylene interrupted by at least one oxygen or nitrogen atom; RG is a group

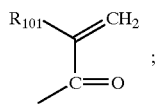

W is an oxygen atom;

R$_{101}$ is H or methyl

R$_{102}$ is H, C$_1$–C$_4$alkyl, allyl, benzyl, C$_1$–C$_6$alkoxy, cyclohexyloxy, acetyl or acryloyl;

R$_{104}$–R$_{107}$ are methyl and

R$_{108}$ and R$_{109}$ are hydrogen.

Particularly preferred is a composition, wherein in the compound of formula (Ia), A is a direct bond; W is an oxygen atom; RG is a group

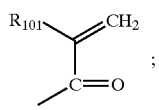

R$_{101}$ is H or methyl; R$_{102}$ is H or C$_1$–C$_4$alkyl; R$_{104}$–R$_{107}$ are methyl; and R$_{108}$ and R$_{109}$ are hydrogen.

Also preferred is a composition, wherein in the compounds of formulae (If), (Ig) or (Ii)

A is a direct bond, C$_2$–C$_6$alkylene or C$_2$–C$_6$alkylene interrupted by at least one oxygen or nitrogen atom W is an oxygen atom;

RG is a group

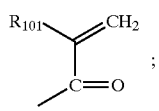

R$_{101}$ is H or methyl;

R$_{201}$ and R$_{202}$ are independently H, C$_1$–C$_8$alkyl, phenyl or OH;

R$_{203}$ and R$_{204}$ are independently H, C$_1$–C$_8$alkyl, phenyl or OH with the proviso that at least one of both is OH;

R$_{205}$ is H, C$_1$–C$_8$alkyl or α-cumyl;

R$_{209}$ is H or Cl;

and k is a number from 1 to 8.

Particularly preferred is a composition, wherein in the compound of formula (Ii)

A is a direct bond
W is an oxygen atom;
RG is a group

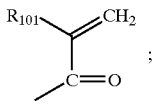

$R_{101}$ is H or methyl;
$R_{205}$ is H $C_1$–$C_8$alkyl, phenyl or α-cumyl;
$R_{209}$ is H or Cl and
k is a number from 1 to 8.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, iso-dodecenyl, n-2-dodecenyl, oleyl, n-2-octadecenyl oder n-4-octadecenyl.

Preferred is alkenyl with 3 bis 12, particularly preferred with 3 to 8 carbon atoms. $C_3$–$C_8$alkenyl can be, for example, 1-propenyl, allyl, methallyl, 2-butenyl, 2-pentenyl, 2-hexenyl, 2-octenyl, or 4-tert-butyl-2-butenyl.

Alkinyl with 3 to 18 is a linear or branched radical as for example propinyl (—$CH_2$—C≡CH), 2-butinyl, 3-butinyl, n-2-octinyl, oder n-2-octadecinyl. Preferred is alkinyl with 3 to 12, particularly preferred with 3 to 8 carbon atoms. $C_3$–$C_8$alkynyl is most preferably propargyl.

Examples of $C_5$–$C_{12}$cycloalkyl are cyclopentyl, cyclohexyl, cycloheptyl or cyclooctyl. Preferred are cycloheptyl and cyclohexyl.

Examples of alkylene containing 1 to 18 carbon atoms are methylene, ethylene, propylene, isopropylene, butylene, 2-butylene, isobutylene, t-butylene, pentylene, 2-pentylene, hexylene, heptylene, octylene, 2-ethylhexylene, t-octylene, nonylene, decylene, undecylene, dodecylene, tridecylene, tetradecylene, hexadecylene and octadecylene.

$C_2$–$C_{18}$alkylene interrupted by at least one O atom is for example —$CH_2$—$CH_2$—O—$CH_2$—$CH_2$—, —$CH_2$—$CH_2$—O—$CH_2$— or —$CH_2$—$CH_2$—O—$CH_2$—$CH_2$—$CH_2$—O—$CH_2$—$CH_2$—. It is preferably derived from polyethlene glycol. A general description is —(($CH_2$)$_a$—O)$_b$—/$CH_2$—, wherein a is a number from 1 to 6 and b is a number from 2 to 10.

Alkenylene with 3 to 18 carbon atoms is a linear or branched radical as for example propenylene, 2-butenylene, 3-butenylene, isobutenylene, n-2,4-pentadienylene, 3-methyl-2-butenylene, n-2-octenylene, n-2-dodecenylene, iso-dodecenylene, n-2-octadecenylene or n-4-octadecenylene.

Alkinylene with 3 to 18 is a linear or branched radical as for example propinylene, 2-butinylene, 3-butinylene, n-2-octinylene, or n-2-octadecinylene. $C_7$–$C_9$phenylalkyl is benzyl, phenylethyl or phenylpropyl, especially benzyl.

$C_1$–$C_8$alkanoyl is, for example, formyl, propionyl, butyryl, octanoyl, but preferably acetyl and $C_3$–$C_5$alkenoyl is in particular acryloyl.

$C_1$–$C_{18}$alkanoyloxy is, for example, formyloxy, acetyloxy, propionyloxy, butyryloxy, valeryloxy, lauroyloxy, palmitoyloxy and stearoyloxy.

$C_5$–$C_7$cycloalkylene is typically, cyclopentylene, methylcyclopentylene, dimethylcyclopentylene, cyclohexylene, methylcyclohexylene or cyclopentylene.

Halogen is Fluorine, Chlorine, Bromine or Iodine, preferably Chlorine or Bromine.

In the compounds according to formula (Ib) $R_{103}$ may form together with the linking carbon atom a $C_5$–$C_6$cycloalkyl radical or a $C_5$–$C_6$heterocycloalkyl radical containing one or two oxygen or nitrogen atoms. Typical examples are derived from 50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]undecane
55) 2,2,6,6-tetramethylpiperidine-4-spiro-2'-(1',3'-dioxane)-5'-spiro-5''-(1'',3''-dioxane-2''-spiro-4'''-(2''',2''',6''',6'''-tetramethylpiperidine) or from
56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro[4.5]decane
62) 2,2-dibutyl-7,7,9,9-tetramethyl-1-oxa-3,8-diaza-4-oxospiro[4.5]decane
63) 2,2,4,4-tetramethyl-7-oxa-3,20-diaza-21-oxodispiro[5.1.11.2]heneicosane
64) 2-butyl-7,7,9,9-tetramethyl-1-oxa-4,8-diaza-3-oxospiro[4.5]decane and preferably:
65) 8-acetyl-3-dodecyl-1,3,8-triaza-7,7,9,9-tetramethylspiro[4.5]decane-2,4-dione The composition may contain additional ethylenically unsaturated monomers or oligomers as component c).

Preferably the ethylenically unsaturated monomer or oligomer is selected from the group consisting of styrene, substituted styrene, conjugated dienes, acrolein, vinyl acetate, (alkyl)acrylic acid anhydrides, acrylonitrile, (alkyl) acrylic acid salts, (alkyl)acrylic esters or (alkyl)acrylamides.

More preferably the ethylenically unsaturated monomer is i-butylene, styrene, α-methyl styrene, p-methyl styrene or a compound of formula $CH_2$=C($R_a$)—(C=Z)—$R_b$, wherein $R_a$ is hydrogen or $C_1$–$C_4$alkyl, $R_b$ is $NH_2$, $O^-$($Me^+$), glycidyl, unsubstituted $C_1$–$C_{18}$alkoxy, $C_1$–$C_{18}$alkoxy interrupted by at least one N and/or O atom, or hydroxy-substituted $C_1$–$C_{18}$alkoxy, $C_1$–$C_{18}$alkoxy interrupted by at least one N and/or O atom, unsubstituted $C_1$–$C_{18}$alkylamino, di($C_1$–$C_{18}$alkyl)amino; hydroxy-substituted $C_1$–$C_{18}$alkylamino or hydroxy-substituted di($C_1$–$C_{18}$alkyl)amino, —O—$CH_2$—$CH_2$—N($CH_3$)$_2$ or —O—$CH_2$—$CH_2$—$N^+H(CH_3)_2$ $An^-$;

$An^-$ is a anion of a monovalent organic or inorganic acid;
Me is amonovalent metal atom, $NH_4^+$ or $HN^+$($C_1$–$C_4$alkyl)$_3$; and
Z is oxygen or sulfur.

More preferably the ethylenically unsaturated monomer is styrene, α-methyl styrene, p-methyl styrene or a compound of formula $CH_2=C(R_a)-(C=Z)R_b$, wherein $R_a$, is hydrogen or $C_1-C_4$alkyl, $R_b$ is $NH_2$, $O^-(Me^+)$, glycidyl, unsubstituted $C_1-C_{18}$alkoxy or hydroxy-substituted $C_1-C_{18}$alkyloxy, unsubstituted $C_1-C_{18}$alkylamino, di($C_1-C_{18}$alkyl)amino, hydroxy-substituted $C_1-C_{18}$alkylamino or hydroxy-substituted di($C_1-C_{18}$alkyl)amino;

Me is a monovalent metal atom

Z is oxygen or sulfur.

Examples of monovalent metal atoms are Li, Na, K.

Examples of the anion $An^-$ of a monovalent organic or inorganic acid are $C_1-C_{18}$carbonic acid anions, the anions of $HClO_4$, HCl or HBr.

Particularly preferred are monomers wherein $R_a$ is hydrogen or methyl, $R_b$ is $NH_2$, gycidyl, unsubstituted or with hydroxy substituted $C_1-C_4$alkoxy, unsubstituted $C_1-C_4$alkylamino, di($C_1-C_4$alkyl)amino, hydroxy-substituted $C_1-C_4$alkylamino or hydroxy-substituted di($C_1-C_4$alkyl)amino; and Z is oxygen.

Most preferably the ethylenically unsaturated monomer is methylacrylate, ethylacrylate, butylacrylate, isobutylacrylate, tert. butylacrylate, hydroxyethylacrylate, hydroxypropylbutylacrylate, dimethylaminoethylacrylate, glycidylacrylates, methyl(meth)acrylate, ethyl(meth)acrylate, butyl(meth)acrylate, hydroxyethyl(meth)acrylate, hydroxypropyl(meth)acrylate, dimethylaminoethyl(meth)acrylate, glycidyl(meth)acrylates, acrylonitrile, acrylamide or methacrylamide.

Suitable compounds of formula (II)

$$Y-X \tag{II},$$

free radicals X· and stable free radicals Y· are known. Stable free radicals having a structural element

are for example disclosed in EP-A-621 878.

Further examples such as

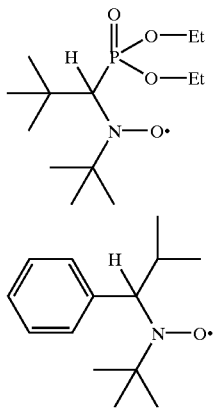

are given in WO 96/24620.

Another suitable stable free radical, 1,3,5,5-Tetraphenyl-1,2,4-triazolin-2-yl, has been described by D. Colombani, M. Steenbock, M. Klapper, K. Müllen in Macromol. Rapid. Commun. 18, 243–251 (1997). Further suitable compounds and their preparation are given in WO 99/03894, GB 2 335 190 and in PCT/EP 99/05377.

Initiator/regulator compounds of formula (II) containing a structural element

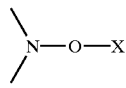

are in principal known. Suitable compounds and their manufacture are for example described in U.S. Pat. No. 4,581,429, U.S. Pat. No. 5,721,320, U.S. Pat. No. 5,627,248, WO 98/13392, WO 98/30601 or in WO 98/44008.

The composition comprises preferably as component b1) a compound of formula (II)

$$Y-X \tag{II},$$

which contains a structural element

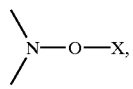

wherein the nitrogen atom is part of a cyclic ring system or is substituted to form a acyclic structure.

A preferred acyclic structure is, wherein the compound containing a structural element

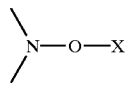

is of formula (XXa), (XXb) or (XXc)

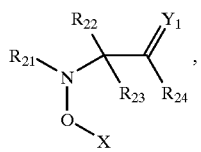
(XXa)

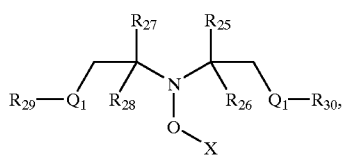
(XXb)

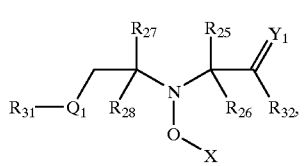
(XXc)

wherein
- $Y_1$ is O or $CH_2$;
- $Q_1$ is O or $NR_{40}$, wherein $R_{40}$ is hydrogen or $C_1-C_{18}$alkyl;
- $R_{21}$ is tertiary $C_4-C_{18}$alkyl or phenyl, which are unsubstituted or substituted by halogen, OH, $COOR_{41}$ or $C(O)-R_{42}$ wherein $R_{41}$ is hydrogen, a alkali metal atom or $C_1-C_{18}$alkyl and $R_{42}$ is $C_1-C_{18}$alkyl; or
- $R_{21}$ is $C_5-C_{12}$cycloalkyl, $C_5-C_{12}$cycloalkyl which is interrupted by at least one O or N atom, a polycyclic alkyl radical or a polycyclic alkyl radical which is interrupted by at least one O or N atom;
- $R_{22}$ and $R_{23}$ are independently $C_1-C_{18}$alkyl, benzyl, $C_5-C_{12}$cycloalkyl or phenyl, which are unsubstituted or substituted by halogen, OH, COOR$_{41}$ or C(O)—R$_{42}$ or together with the carbon atom form a C$_5$–C$_{12}$cycloalkyl ring;

if Y$_1$ is O, R$_{24}$ and R$_{32}$ are OH, O(alkali-metal) C$_1$–C$_{18}$alkoxy, benzyloxy, NR$_{43}$R$_{44}$, wherein R$_{43}$ and R$_{44}$ are independently from each other hydrogen, C$_1$–C$_{18}$alkyl or phenyl, which are unsubstituted or substituted by halogen, OH, COOR$_{41}$ or C(O)—R$_{42}$;

if Y$_1$ is CH$_2$, R$_{24}$ is OH, C$_1$–C$_{18}$alkoxy, benzyloxy, O—C(O)—(C$_1$-C$_{18}$)alkyl or NR$_{43}$R$_{44}$;

R$_{32}$ are a group C(O)R$_{45}$, wherein R$_{45}$ is OH, C$_1$–C$_{18}$alkoxy, benzyloxy, NR$_{43}$R$_{44}$, wherein R$_{43}$ and R$_{44}$ are independently from each other hydrogen, C$_1$–C$_{18}$alkyl or phenyl, which are unsubstituted or substituted by halogen, OH, COOR$_{41}$ or C(O)—R$_{42}$;

R$_{25}$, R$_{26}$, R$_{27}$ and R$_{28}$ are independently of each other C$_1$–C$_{18}$alkyl, C$_5$–C$_{12}$cycloalykyl or phenyl; or R$_{25}$ and R$_{26}$ and/or R$_{27}$ and R$_{28}$ together with the carbon atom form a C$_5$–C$_{12}$cycloalkyl ring;

R$_{29}$ and R$_{30}$ are independently of each other hydrogen, C$_1$–C$_{18}$alkylcarbonyl, benzoyl, C$_1$–C$_{18}$alkyl, C$_5$–C$_{12}$cycloalkyl, C$_5$–C$_{12}$cycloalkyl which is interrupted by at least one O or N atom, benzyl or phenyl which are unsubstituted or substituted by halogen, OH, COOR$_{41}$ or C(O)—R$_{42}$;

R$_{31}$, is C$_1$–C$_{18}$alkylcarbonyl, benzoyl, C$_1$–C$_{18}$alkyl, C$_5$–C$_{12}$cycloalkyl, C$_5$–C$_{12}$cycloalkyl which is interrupted by at least one O or N atom, benzyl or phenyl which are unsubstituted or substituted by halogen, OH, COOR$_{41}$ or C(O)—R$_{42}$; and X represents a group having at least one carbon atom and is such that the free radical X· derived from X is capable of initiating polymerization of ethylenically unsaturated monomers.

Examples for the different substituents have been already given.

Typical examples of suitable compounds are given in Table 1. These compounds and there preparation is described in PCT/EP 99/05377.

TABLE 1

| No. | Structure |
|-----|-----------|
| 201 | |
| 202 | |
| 203 | |
| 204 | |
| 205 | |
| 206 | |
| 207 | |
| 208 | |
| 209 | |

TABLE 1-continued

| No. | Structure |
|---|---|
| 210 | |
| 211 | |
| 212 | |
| 213 | |
| 214 | |

Other suitable compounds with symmetrical substitution pattern are derived from nitroso compounds or nitrons and are described in WO 99/03894. Typical examples are given in Table 2. The nitroso and nitrone compounds can also be used as in situ precursors to form the compounds of Table 2 simultaneously to the polymerization step. This is described in WO 99/03894.

TABLE 2

| No. | Compound |
|---|---|
| 301 | |
| 302 | |
| 307 | |
| 308 | |

Preferably the initiator/regulator compounds form a cyclic structure

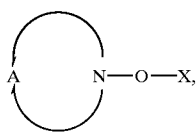

which may be a 5, 6, 7 or 8 ring system having no hydrogen atom in α-position to the nitrogen atom and which may contain one additional heteroatom in the ring.

Particularly suitable initiator/regulator compounds are 1-alkoxy-polyalkyl-piperidine derivatives containing a structural element of formula (X)

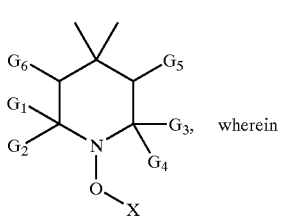

wherein $G_1$, $G_2$, $G_3$, $G_4$ are independently $C_1$–$C_6$alkyl with the proviso that at least one is not methyl or $G_1$ and $G_2$ or $G_3$ and $G_4$, or $G_1$ and $G_2$ and $G_3$ and $G_4$ together form a $C_5$–$C_{12}$cycloalkyl group;

$G_5$, $G_6$ independently are H, $C_1$–$C_{18}$alkyl, phenyl, naphthyl or a group $COOC_1$–$C_{18}$alkyl and X represents a group having at least one carbon atom and is such that the free radical X· derived from X is capable of initiating polymerization of ethylenically unsaturated monomers.

These compounds and their preparation are described in GB 2 335 190.

Particularly suitable compounds are listed in Table 3.

TABLE 3

| No. | Compound |
|---|---|
| 401 | 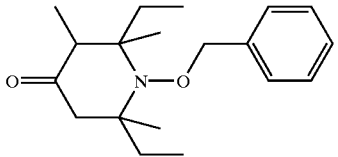 |
| 402 | 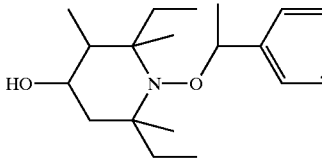 |
| 403 | 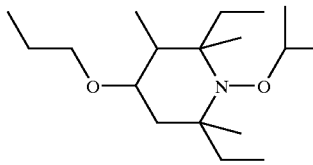 |
| 404 | 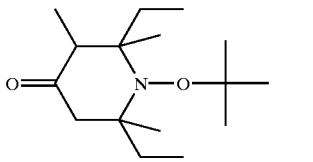 |
| 405 | 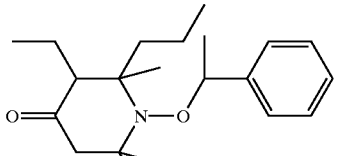 |
| 406 | 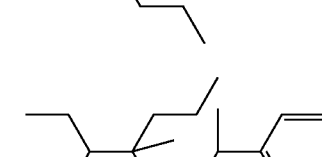 |
| 407 | 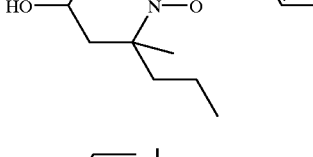 |

TABLE 3-continued

| No. | Compound |
|---|---|
| 408 | 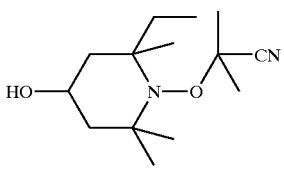 |
| 409 | 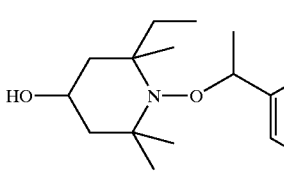 |
| 410 | 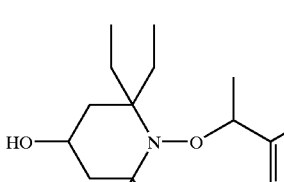 |
| 411 | 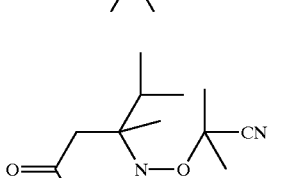 |
| 412 | 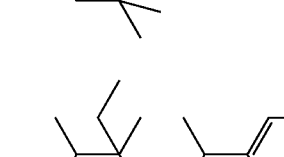 |

Another preferred class of initiators are those of formula (Xa) or (Xb)

(Xa)

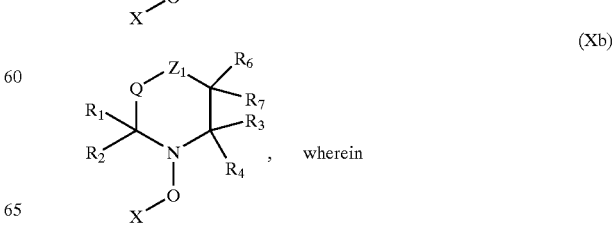

(Xb)

wherein $R_1$, $R_2$, $R_3$ and $R_4$ independently of each other are $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by OH, halogen or a group —O— C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl or $R_1$ and $R_2$ and/or $R_3$ and $R_4$ together with the linking carbon atom form a $C_3$–$C_{12}$cycloalkyl radical;

$R_5$, $R_6$ and $R_7$ independently are hydrogen, $C_1$–$C_{18}$alkyl or $C_6$–$C_{10}$aryl;

X represents a group having at least one carbon atom and is such that the free radical X· derived from X is capable of initiating polymerization of ethylenically unsaturated monomers;

$Z_1$ is O or $NR_8$;

$R_8$ is hydrogen, OH, $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by one or more OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl, $C_7$–$C_9$phenylalkyl, $C_5$–$C_{10}$heteroaryl, —C(O)—$C_1$–$C_{18}$alkyl, —O—$C_1$–$C_{18}$alkyl or —COO$C_1$–$C_{18}$alkyl;

Q is a direct bond or a divalent radical $CR_9R_{10}$, $CR_9R_{10}$—$CR_{11}R_{12}$, $CR_9R_{10}CR_{11}R_{12}CR_{13}R_{14}$, C(O) or $CR_9R_{10}C(O)$, wherein $R_9$, $R_{10}$, $R_{11}$, $R_{12}$, $R_{13}$ and $R_{14}$ are independently hydrogen, phenyl or $C_1$–$C_{18}$alkyl.

The compounds and their preparation are described in WO 98/30601, WO 98/44008 and in the British patent application No. 9923579.8.

Particularly useful are the compounds listed in Table 4, 5 and 6.

TABLE 4

| 5-ring compounds | |
|---|---|
| No. | Structure |
| 101 | |
| 102 | |

TABLE 4-continued

| 5-ring compounds | |
|---|---|
| No. | Structure |
| 105 | |
| 106 | |

TABLE 5

| 6-ring compounds | |
|---|---|
| No. | Structure |
| 107 | |
| 108 | |

TABLE 5-continued 6-ring compounds

| No. | Structure |
|---|---|
| 109 | |
| 110 | |
| 111 | |
| 112 | |
| 113 | |
| 114 | |
| 115 | |
| 116 | |
| 117 | |
| 118 | |

TABLE 5-continued 6-ring compounds

| No. | Structure |
|-----|-----------|
| 119 | |
| 120 | |
| 121 | |
| 122 | |
| 123 | |
| 124 | |
| 125 | |
| 126 | |

TABLE 6

| No. | Structure |
|---|---|
| 127 | 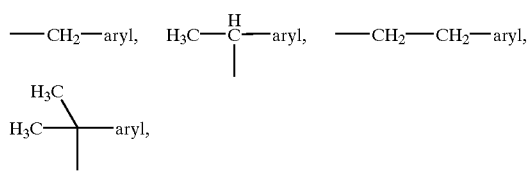 |
| 128 | 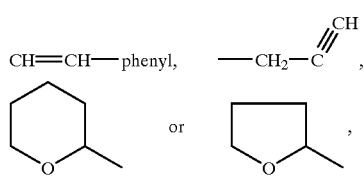 |

Preferably X is selected from the group consisting of

—CH$_2$—aryl, H$_3$C—CH—aryl, —CH$_2$—CH$_2$—aryl, (CH$_3$)$_3$C—aryl, (CH$_3$)$_2$—aryl, (C$_5$–C$_6$cycloalkyl)$_2$CCN, (C$_1$–C$_{12}$alkyl)$_2$CCN, —CH$_2$CH=CH$_2$, (C$_1$–C$_{12}$)alkyl-CR$_{20}$—C(O)—(C$_1$–C$_{12}$alkyl, (C$_1$–C$_{12}$)alkyl-CR$_{20}$—C(O)—(C$_6$–C$_{10}$aryl, (C$_1$–C$_{12}$)alkyl-CR$_{20}$—C(O)—(C$_1$–C$_{12}$)alkoxy, (C$_1$–C$_{12}$)alkyl-CR$_{20}$—C(O)-phenoxy, (C$_1$–C$_{12}$)alkyl-CR$_{20}$—C(O)—N-di(C$_1$–C$_{12}$)alkyl, (C$_1$–C$_{12}$)alkyl-CR$_{20}$—CO—NH (C$_1$–C$_{12}$)alkyl, (C$_1$–C$_{12}$)alkyl-CR$_{20}$—CO—NH$_2$, —CH$_2$CH=CH—CH$_3$, —CH$_2$—C(CH$_3$)=CH$_2$, —CH$_2$—

CH=CH—phenyl, —CH$_2$—C≡CH,

wherein
R$_{20}$ is hydrogen or C$_1$–C$_{12}$alkyl;
the aryl groups are unsubstituted or substituted with C$_1$–C$_{12}$alkyl, halogen, C$_1$–C$_{12}$alkoxy, C$_1$–C$_{12}$alkylcarbonyl, glycidyloxy, OH, —COOH or —COOC$_1$–C$_{12}$alkyl.

More preferred are compounds, wherein X is selected from the group consisting of —CH$_2$-phenyl, —CH$_3$CH-phenyl, (CH$_3$)$_2$C-phenyl, (C$_5$–C$_6$cycloalkyl)$_2$CCN, (CH$_3$)$_2$CCN, —CH$_2$CH=CH$_2$, CH$_3$CH—CH=CH$_2$, (C$_1$–C$_8$alkyl) CR$_{20}$—C(O)-phenyl, (C$_1$–C$_8$)alkyl-CR$_{20}$—C(O)—(C$_1$–C$_8$) alkoxy, (C$_1$–C$_8$)alkyl-CR$_{20}$—C(O)—(C$_1$–C$_8$)alkyl, (C$_1$–C$_8$) alkyl-CR$_{20}$—C(O)—N-di(C$_1$–C$_8$)alkyl, (C$_1$–C$_8$)alkyl-CR$_{20}$—C(O)—NH(C$_1$–C$_8$)alkyl, (C$_1$–C$_8$)alkyl-CR$_{20}$—C (O)—NH$_2$, wherein R$_{20}$ is hydrogen or (C$_1$–C$_8$)alkyl.

Particularly preferred are compounds, wherein X is selected from the group consisting of —CH$_2$-phenyl, —CH$_3$CH-phenyl, (CH$_3$)$_2$C-phenyl, (C$_5$–C$_6$cycloalkyl)$_2$ CCN, (CH$_3$)$_2$CCN, —CH$_2$CH=CH$_2$, CH$_3$CH—CH=CH$_2$, (C$_1$–C$_4$alkyl)CR$_{20}$—C(O)-phenyl, (C$_1$–C$_4$)alkyl-CR$_{20}$—C (O)—(C$_1$–C$_4$)alkoxy, (C$_1$–C$_4$)alkyl-CR$_{20}$—C(O)—(C$_1$–C$_4$) alkyl, (C$_1$–C$_4$)alkyl-CR$_{20}$—C(O)—N-di(C$_1$–C$_4$)alkyl, (C$_1$–C$_4$)alkyl-CR$_{20}$—C(O)—NH(C$_1$–C$_4$)alkyl, (C$_1$–C$_4$) alkyl-CR$_{20}$—C(O)—NH$_2$, wherein R$_{20}$ is hydrogen or (C$_1$–C$_4$)alkyl.

Another embodiment of the present invention is a composition, wherein component b3) is present as an alternative for b1) or b2).

A suitable component b3) contains a compound of formula (III), $$[In]_p\text{—}[Hal]_q \tag{III}$$

with a radically transferable atom or group ·Hal as is described in WO 96/30421 and WO 98/01480. A preferred radically transferable atom or group ·Hal is ·Cl or ·Br, which is cleaved as a radical from the initiator molecule.

Preferably [In] represents the polymerization initiator fragment of a polymerization initiator of formula (III), $$[In]_p\text{—}[Hal]_q, \tag{III}$$

capable of initiating polymerization of monomers or oligomers which polymerization initiator is selected from the group consisting of C$_1$–C$_8$-alkyl halides, C$_6$–C$_{15}$-aralkylhalides, C$_2$–C$_8$α-haloalkyl esters, arene sulfonyl chlorides, haloalkanenitrites, α-haloacrylates and halolactones, p and q represent one and the other components as defined above.

The polymerization process in the presence of a compound of formula (III) is known as ATRP (Atom Transfer Radical Polymerization) and WO 96/30421 discloses a controlled or "living" polymerization process of ethylenically unsaturated polymers such as styrene or (meth) acrylates by employing the ATRP method. According to this method initiators are employed which generate a radical atom such as ·Cl, in the presence of a redox system of transition metals of different oxidation states, e.g. Cu(I) and Cu(II), providing "living" or controlled radical polymerization.

Specific initiators are selected from the group consisting of α,α'-dichloro- or α,α'-dibromoxylene, p-toluenesulfonylchloride (PTS), hexakis-(α-chloro- or α-bromomethyl)-benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloroisobutyrate, chloro- or bromoacetonitrile, 2-chloro- or 2-bromopropionitrile, α-bromo-benzacetonitrile and α-bromo-γ-butyrolactone (=2-bromo-dihydro-2(3H)-furanone).

The transition metal in the oxidizable transition metal complex catalyst salt used in the process of the invention is present as an oxidizable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Ru^{2+}/Ru^{3+}$, $Ru^{3+}/Ru^{4+}$, $Os^{2+}/Os^{3+}$, $V^{n+}/V^{(n+1)+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$, or $Zn^+/Zn^{2+}$.

The ionic charges are counterbalanced by anionic ligands commonly known in complex chemistry of transition metals, such hydride ions ($H^-$) or anions derived from inorganic or organic acids, examples being halides, e.g. $F^-$, $Cl^-$, $Br^-$ or $I^-$, fluoro complexes of the type $BF_4^-$, $PF_6^-$, $SbF_6^-$ or $AsF_6^-$, anions of oxygen acids, alcoholates or acetylides or anions of cyclopentadiene.

Anions of oxygen acids are, for example, sulfate, phosphate, perchlorate, perbromate, periodate, antimonate, arsenate, nitrate, carbonate, the anion of a $C_1$–$C_8$ carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate (triflate), unsubstituted or $C_1$–$C_4$ alkyl-, $C_1$–$C_4$ alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methylphosphonate, ethylphosphonate, propylphosphonate, butylphosphonate, phenylphosphonate, p-methylphenylphosphonate or benzylphosphonate, carboxylates derived from a $C_1$–$C_8$ carboxylic acid, for example formate, acetate, propionate, butyrate, benzoate, phenylacetate, mono-, di- or trichloro- or -fluoroacetate, and also $C_1$–$C_{12}$-alcoholates, such as straight chain or branched $C_1$–$C_{12}$-alcoholates, e.g. methanolate or ethanolate. Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$–$C_4$ alkyl$)_4N^+$.

Suitable neutral ligands are inorganic or organic neutral ligands commonly known in complex chemistry of transition metals. They coordinate to the metal ion through a σ-, π-, μ-, η-type: bonding or any combinations thereof up to the preferred coordination number of the complex cation. Suitable inorganic ligands are selected from the group consisting of aquo ($H_2O$), amino, nitrogen, carbon-monoxide and nitrosyl. Suitable organic ligands are selected from the group consisting of phosphines, e.g. $(C_6H_5)_3P$, $(i-C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine ($Me_6TREN$), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethyltriamine (PMDETA), $C_1$–$C_8$-glycols or glycerides, e.g. ethylene or propylene glycol or derivatives thereof, e.g. di-, tri- or tetraglyme, and monodentate or bidentate heterocyclic $e^-$ donor ligands.

Heterocyclic $e^-$ donor ligands are derived, for example, from unsubstituted or substituted heteroarenes from the group consisting of furan, thiophene, pyrrole, pyridine, bis-pyridine, picolylimine, g-pyran, g-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene purine, bis-imidazole and bis-oxazole.

The oxidizable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, $Me_6TREN$ or PMDETA.

Preferred is a composition, wherein in the component b3) the oxidizable transition metal in the transition metal complex salt is present as a transition metal complex ion in the lower oxidation state of a redox system.

More preferred is a composition, wherein the transition metal complex ion is a Cu(I) complex ion in the Cu(I)/Cu(II) system.

Another subject of the invention is a process for preparing an oligomer, cooligomer, polymer or copolymer with a polydispersity $M_w/M_n$ between 1 and 3, which process comprises reacting a composition of a) at least one compound of formula (I)

$$(RG)\text{—}A\text{—}(Stab) \tag{I}$$

wherein
  (Stab) is a light stabilizer radical selected from the group consisting of sterically hindered amines, hydroxyphenyl-s-triazines, hydroxyphenyl-benzotriazols and o-hydroxybenzophenones; A is a spacer group or a direct bond; and
  (RG) is a group containing at least one ethylenically unsaturated functional group; with either b1) a compound of formula (II)

$$X\text{—}Y \tag{II}$$

wherein
  X represents a group having at least one carbon atom and is such that the free radical derived from X is capable of initiating polymerization and
  Y represents a group being such that the free radical derived from it forms a stable free radical or b2) a free radical source from which a radical X· is formed capable of initiating polymerization and a stable free radical Y·; or b3) a compound of formula (III)

$$[In]_p\text{—}[Hal]_q \tag{III}$$

and a catalytically effective amount of an oxidizable transition metal complex catalyst, wherein
  p represents a number greater than zero and defines the number of initiator fragments;
  q represents a numeral greater than zero;
  [In] represents a radically transferable atom or group capable of initiating polymerization and -[Hal] represents a leaving group; and optionally simultaneously or in a subsequent step with c) one or more ethylenically unsaturated monomers or oligomers different from those of formula (I), at a temperature between 50° C. and 180° C.

Preferably the temperature ranges from about 80° C. to about 150° C. At temperatures above about 180° C., the controlled conversion of the monomers into polymers may decrease, and undesirable by-products like thermally initiated polymers are formed or decomposition of the components may occur.

The isolating step of the present process may be carried out by known procedures, e.g. by precipitation, distilling and filtering off unreacted monomer. After completing the reaction catalyst salts may be filtered off, followed by evaporation of the solvent or by precipitation of polymer in a suitable liquid phase, filtering the precipitated polymer, washing and drying.

The resulting oligomers, polymers, cooligomers and copolymers have a narrow molecular weight distribution. Preferably the polydispersity $M_w/M_n$ is between 1.0 and 2, more preferably between 1.0 and 1.5 and most preferably between 1.0 and 1.4.

Preferred molecular weights $M_n$ are between 1000 and 50 000, more preferred between 1000 and 10 000 and most preferred between 1000 and 5 000.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

If more than one polymerizable compound of formula (I) is used, copolymers with different light stabilizer structures are formed. These copolymers may be either random or block copolymers. Because the present polymerization is a "living" polymerization, it can be started and stopped practically at will. Furthermore, the polymer product retains the functional alkoxyamine group or the -Hal group allowing a continuation of the polymerization in a living matter. Thus, in one embodiment of this invention, once the first polymerizable compound of formula (I) is consumed in the initial polymerizing step a second polymerizable compound of formula (I) can then be added to form a second block on the growing polymer chain in a second polymerization step. Therefore it is possible to carry out additional polymerizations with the same or different compounds of formula (I) or with other suitable monomers to prepare multi-block copolymers. Furthermore, since this is a radical polymerization, blocks can be prepared in essentially any order. One is not necessarily restricted to preparing block copolymers where the sequential polymerizing steps must flow from the least stabilized polymer intermediate to the most stabilized polymer intermediate, such as is the case in ionic polymerization.

The process is particularly useful for the preparation of block copolymers containing different light stabilizer groups in blocks in the copolymer. A typical example is a block copolymer containing a hydroxy-phenyl-benzotriazol or a hydroxy-phenyl-s-triazine UV-absorber in one block whereas the other block is build from a 2,2,6,6,-tertamethyl-piperidine group.

In addition to the polymerizable compounds of formula (I) conventional monomers can be used as comonomers, which may be desirable in some cases.

Suitable amounts of other comonomers c) are from 1% to 50% by weight based on total monomers.

Suitable ethylenically unsaturated monomers or oligomers have been already given.

The initiator/regulator compound b1) is preferably present in an amount of from 0.1 mol-% to 30 mol-%, more preferably in an amount of from 0.1 mol-% to 20 mol-%, and most preferably in an amount of from 0.5 mol-% to 10 mol-% based on the monomer or monomer mixture.

The majority of compounds of formula (Ia) to (Ij) are known and can be prepared according to standard methods.

Examples wherein the light stabilizer is a hydroxy-phenyl-triazine are given in EP-A-0 434 608, U.S. Pat. No. 5,189,084 or U.S. Pat. No. 5,672,704. Examples wherein the light stabilizer is a hydroxy-phenyl-benzotriazole are given in U.S. Pat. No. 4,785,063 or U.S. Pat. No. 5,112,912. Examples of suitable functionalized benzophenones are given in J. Polym. Sci. (1982), 27(7), 2605–13.

Polymerizable sterically hindered amines (2,2,6,6-tetramethyl-piperidines) are for example disclosed in U.S. Pat. No. 4,210,612, U.S. Pat. No. 4,294,949 or U.S. Pat. No. 4,276,401.

Polymerizable sterically hindered amines from the classes of morpholinone, piperazinone and piperazindione are disclosed in WO 99/14206, GB 2 333 774 and GB 9913511.3.

Definitions and preferences for the different groups and substituents have been given above, they apply also for the process.

The source of radicals in component b2) may be a bis-azo compound, a peroxide or a hydroperoxide.

Preferably, the source of radicals is 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide.

Preferred peroxides and hydroperoxides are acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl) peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis (t-butylperoxy)3,5-dimethyl 1,2-dioxolane, di-t-butyl peroxide, 2,5-dimethylhexyne-2,5-di-t-butylperoxide, 3,3,6, 6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

These compounds are commercially available.

If more than one radical source is used, a mixture of substitution patterns is obtainable.

If b2) a free radical source and a stable free radical are applied separately, the stable free radical is preferably present in an amount of from 0.1 mol-% to 30 mol-%, more preferably in an amount of from 0.1 mol-% to 20 mol-%, and most preferably in an amount of from 0.5 mol-% to 10 mol-% based on the monomer or monomer mixture.

The molar ratio of the radical source to the stable nitroxyl radical may be from 1:10 to 10:1, preferably from 1:5 to 5:1 and more preferably from 1:2 to 2:1.

If b3) is applied, the compound of formula (III)

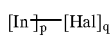
$$[In]_p\text{—}[Hal]_q \tag{III}$$

is preferably present in an amount of from 0.1 mol-% to 30 mol-%, more preferably in an amount of from 0.1 mol-% to 20 mol-%, and most preferably in an amount of from 0.5 mol-% to 10 mol-% based on the monomer or monomer mixture.

A catalytically effective amount of an oxidizable transition metal complex catalyst is preferably 100 ppm to 1%, more preferably 100 ppm to 5000 ppm based on the monomer or monomer mixture. Preferably the molar ratio of complexing agent to transition metal is from 1:5 to 5:1, more preferably from 2:1 to 1:2.

If the process b3) is applied the resulting polymer oligomer contains at its end a halogen atom. This halogen atom can be exchanged by reacting a stable free radical Y· with the oligomer or polymer. In this case the free radical is attached to the polymer and the halogen atom is removed. The exchange process is described in PCT/EP 99/06924.

Another subject of the invention is a oligomer, polymer, cooligomer copolymer obtainable by the above mentioned processes.

Still another subject of the invention are the compounds 1,1,3,3-Tetraethyl-2-(1-phenyl-ethoxy)-2,3-dihydro-1.H.-isoindole, 1-(1,1,3,3-Tetraethyl-1,3-dihydro-isoindol-2-yloxy)-cyclohexanecarbonitrile or N-(1,1,3,3-tetramethylbutyl)-N,O-bis-(1-cyano-1-methyl-ethyl)-hydroxylamin. These compounds used as polymerization regulators PR3, PR4 and PR5 are new.

The oligomers, polymers cooligomers or copolymers obtained by the present process are useful as light or heat stabilizers, particular UV-light stabilizers of organic materials. Preferred organic materials are natural or synthetic polymers. Examples are given below.

The term heat or light stabilizer in the context of the present invention means stabilization against the influences of heat and/or actinic or electromagnetic radiation ranging from γ to infrared.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density arid high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins; i.e. the polymers of monoolefins exemplified in the preceding paragraph, preferably polyethylene and polypropylene, can be prepared by different, and especially by the following, methods:

a) radical polymerization (normally under high pressure and at elevated temperature).

b) b catalytic polymerization using a catalyst that normally contains one or more than one metal of groups IVb, Vb, VIb or VIII of the Periodic Table.These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or, IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density. polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidenenorbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl-halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplazstic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Still a further subject of the present invention is the use of a oligomer, polymer, cooligomer, or copolymer of formula (III), (IIIa); (IIIb), (IIIc), (IIId), (IIIe) or (IIIf) as light stabilizers for organic materials, particularly for natural and synthetic polymers.

Most preferred are thermoplastic polymers and crosslinked polymers, such as thermosetting enamels, paints, laquers and varnishes.

Also subject of the present invention are organic materials stabilized against UV-light with a oligomer, polymer, cooligomer or copolymer of formula (III), (IIIa), (IIIb), (IIIc), (IIId), (IIIe) or (IIIf).

The organic material may contain additional additives and stabilizers. Examples are given below.

1. Antioxidants
  1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethyl-phenol, 2,6-dioctadecyl-4-methylphenol, 2,4,6-tricyclohexylphenol, 2,6-di-tert-butyl-4-methoxymethylphenol, nonylphenois which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.
  1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
  1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.
  1.4. Tocopherols, for example α-tocopherol, β-tocopherol, γ-tocopherol, δ-tocopherol and mixtures thereof (Vitamin E).
  1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.
  1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.
  1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzylmercaptoacetate.
  1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
  1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
  1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.
  1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
  1.12. Acylaminophenols, for example 4-hydroxyl-auranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenylpropionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyohenyl) propionic acid e.g. N,N'-bis(3,5-di-tert-butyl-4-hydroxyphenylpropionyl)hexamethylenediamide, N,N'bis(3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-diisopropyl-p-phenylenediamine, N,N'-di-sec-butyl-p-phenylenediamine, N,N'bis(1,4-dimethylpentyl)-p-phenylenediamine, N,N'bis(1-ethyl-3-methylpentyl)-p-phenylenediamine, N,N'bis(1-methylheptyl)-p-phenylenediamine, N,N'-dicyclohexyl-p-phenylenediamine, N,N'-diphenyl-p-phenylenediamine, N,N'bis(2-naphthyl)-p-phenylenediamine, N-isopropyl-N'-phenyl-p-phenylenediamine, N-(1,3-dimethylbutyl)-N'-phenyl-p-phenyleriediazmine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenylpenzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenylbenzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenztriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$$\frac{}{2}$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5- di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-pi-peridyl) n-butyl-3, 5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis (2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]), N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanlide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'bis(3,5-di-tert-butyl-4-hydroxyphenyl-propionyl) hydrazine, 3-salicyloylamino-1,2,4-triazole, bis (benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-bu-tylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl)

ethyl phosphite, 2,2',2''-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl) phosphite (Irgafos®168, Ciba-Geigy), tris(nonylphenyl) phosphite,

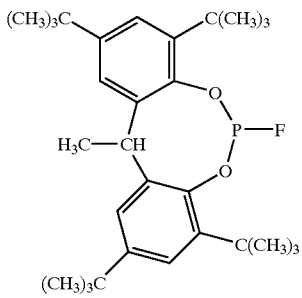
(A)

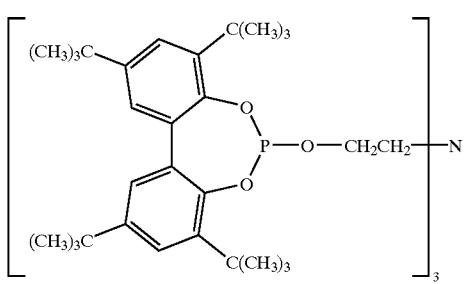
(B)

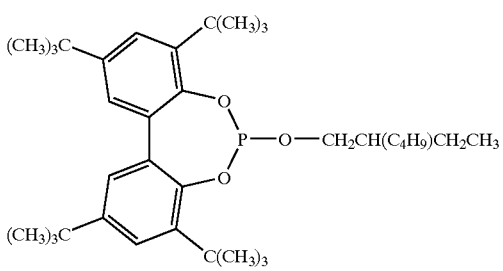
(C)

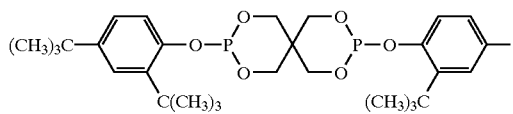
(D)

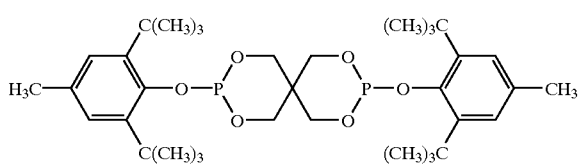
(E)

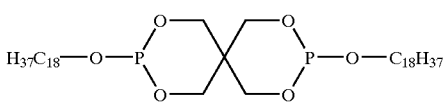
(F)

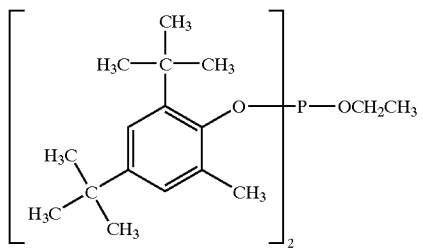
(G)

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl, N-octadecyl-hydroxylamine, N,N-dialkylhydroxylamine derived from hydrogenated tallow amine.

6. Nitrones, for example, N-benzyl-alpha-phenyl-nitrone, N-ethyl-alpha-methylnitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithio-carbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, eg. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flowcontrol agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591 102 or 3-[4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di-methylphenyl)-5,7-di-tert-butyl-benzofuran-2-one.

The following examples illustrate the invention.

A) Polymerization Examples Using Compounds of Formula (II)

X—Y  (II)

General Remarks:

All monomers employed are used in purities of >99% and without any stabilisers. Accordingly, the monomers are distilled or recrystallised immediately before polymerization. The polymerization regulators employed are recrystallised, distilled or chromatographed to be used in purities of >99%. Solvents are also distilled under inert gas. The polymerization is carried out under argon gas, the polymerization solution being freed beforehand from oxygen by repeated evacuation under vacuum and rinsing with argon. After the polymerization, the solution is freed from the volatile components (solvent, monomer) by vacuum distillation at 80° C. In cases where the monomers cannot be distilled, the polymer is isolated by precipitation. The polymerization yield is the result of the weight of the residue minus the weight of the polymerization regulator and catalyst used. In case that viscous liquids are obtained, catalyst residues can be removed by filtration under pressure at 80° C.

List of the polymerization regulators used:

| No. | Formula |
|---|---|
| PR1 | 1-α-methylbenzyloxy-2,6-diethyl-2,3,6-trimethyl-4-oxypiperidine |
| |  |
| PR2 | N-(1,1,3,3-tetramethyl-butyl)-N,O-bis-(1-cyano-cyclohexyl)-hydroxylamin |
| | 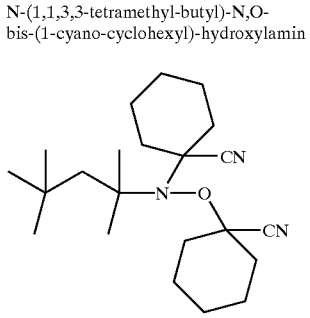 |
| PR3 | 1,1,3,3-Tetraethyl-2-(1-phenyl-ethoxy)-2,3-dihydro-1.H.-isoindole |
| PR4 | 1-(1,1,3,3-Tetraethyl-1,3-dihydro-isoindol-2-yloxy)-cyclohexanecarbonitrile |
| PR5 | N-(1,1,3,3-tetramethyl-butyl)-N,O-bis-(1-cyano-1-methyl-ethyl)-hydroxylamin |
| PR6 | {1-[.tert.-Butyl-(1-phenyl-ethoxy)-amino]-2,2-dimethyl-propyl}-phosphonic acid diethyl ester |

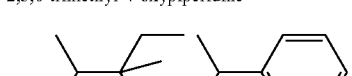

PR1 is known and prepared as described in GB 2 335 190 (compound 112).

PR2 and PR5 are known and prepared as described in WO 99/03894 (compounds 102 and 101)

PR3 is prepared from tetraethylisoindolin-N-oxyl described in EP-A-135 280, which is reacted with ethyl-benzene and di-tert-butylperoxide in the presence of UV light as described in GB 2 335 190, example 6. A colorless oil is obtained. Chemical analysis calculated: C, 82.24%; H, 9.20%; N, 4.00%; found: C, 82.12%; H, 9.49%; N, 4.00%.

PR4 is prepared from tetraethylisoindolin-N-oxyl described in EP-A-135 280, which is reacted with azo-bis-cyclohexane-carbonitril in analogy to example 14 as described in GB 2 335 190. Colorless crystals are obtained with a melting point of 122–125° C. Chemical analysis calculated: C, 77.92%; H, 9.67%; N, 7.90%; found: C, 77.81%; H, 9.67%; N, 7.82%.

PR6 is prepared from N-t-butyl-1-diethylphosphono-2,2-dimethylpropylamin-1-oxyl described in WO 96/24620, which is reacted with ethyl-benzene and di-tert-butylperoxide in the presence of UV light as described in GB 2 335 190, example 6. A colorless oil is obtained.

1H-NMR(selected lines in $CDCL_3$: 5.00 ppm (1H, quartet, Ph—CH—).

1. Homopolymerizations With (4-Acryloyloxy-1,2,2,6,6-pentamethylriperidine (APP)

A1) Poly(4-acryloyloxy 1,2,2,6,6-Pentamethylpiperidine)

A tared 50 ml round-bottom flask, equipped with magnetic stirrer and reflux condenser, is charged with 0.846 g (2.6 mmol) of PR 1, 10 g (44.4 mmol) of 4-acryloyloxy-1,2,2,6,6-pentamethylpiperidine (APP) and 5 g of n-pctane. This solution is cooled using dry ice/acetone and is evacuated under high vacuum. The solution is then rinsed with argon and the same process is repeated twice. The reaction solution is stirred for 5 hours at 130° C. under argon. Subsequently, the reaction solution is cooled to room temperature and the solvent as well as the unreacted monomer are removed by evaporation at a maximum of 80° C. under water-jet vacuum and then under high vacuum.

Yield: 4.6 g (46%); GPC: Mn=1000 Mw=1400 PD=1.4.

A2) Poly(4-acryloyloxy-1,2,2,6,6-pentamethytpiperidine)

The procedure of Example A1) is repeated, but replacing PR 1 with 0.814 g (2.3 mmol) of PR 3 and reacting it with 8.7 g (38.6 mmol) of APP monomer and.4.4 g of n-octane.

Yield: 8.4 g (97%); GPC: Mn=900 Mw=1100 PD=1.3.

A3) to A6) Poly(4-acryloyloxy-1,2,2,6,6-pentamethylpiperidine) prepared with 6 mol % polymerization regulators (PR);

| Ex. No. | PR | Yield | Mn | Mw | PD |
|---|---|---|---|---|---|
| A3 | PR 4 | 50% | 800 | 900 | 1.1 |
| A4 | PR 2 | 99% | 1700 | 2800 | 1.6 |
| A5 | PR 5 | 96% | 1900 | 2800 | 1.5 |
| A6 | PR 6 | 93% | 1600 | 2500 | 1.5 |

2. UV Absorber Homopolymers

A7) Poly(4-acryloyloxy-2-hydroxybenzophenone)

In a 50 ml round-bottom flask, equipped with magnetic stirrer and reflux condenser, 10 g (37.3 mmol) of 4-acryloyloxy-2-hydroxybenzophenone are polymerized with 5 ml of dioxan and 0.8049g (2.2 mmol) of PR 2 for 5 hours at 10° C. The solution is precipitated in acetonitrile, giving 8.3 g (75%) of a yellowish solid.

GPC: Mn=3900 Mw=7000 PD=1.8.

A8) Poly(2-methylacrylic Acid-6-(3-benzotriazol-2-yl-5-tert-butyl-4-hydroxyphenyl)hexyl Ester In a 50 ml round-bottom flask, equipped with magnetic stirrer and reflux condenser, 10 g (22.9 mmol) of 2-methylacrylic acid-6-(3-benzotriazol-2-yl-5-tert-butyl-4-hydroxyphenyl)hexyl ester are polymerized with 5 ml of dioxan and 0.495 g (1.4 mmol) of PR 2 for 5 hours at 105° C. The solution is precipitated in n-hexane, giving 8.6 g (81%) of a yellowish solid.

GPC: Mn=4700 Mw=7100 PD=1.5.

3. Copolymers

A9) Random Copolymer of n-Butylacrylate and APP 1.57 g (4.4 mmol) of PR 2, 7 g (54.6 mmol) of n-butylacrylate, 12.3 g (54.6 mmol) of APP and 9.7 g of octane are polymerized in a 100 ml round-bottom flask for 5 hours at 130° C. The solvent and the unreacted monomer are removed by evaporation under high vacuum.

Yield: 20.6 g (99%) of a viscous liquid. GPC: Mn=3300 Mw=6900 PD=2.1.

A10) Random Copolymer of n-Butylacrylate and Methacryloyloxy-1,2,2,6,6,-pentamethylpiperidine (MAPP)

1.57 g (4.4. mmol) of PR 2, 7 g (54.6 mmol) of n-butylacrylate, 13.1 g. (54.6 mmol) of APP and 10 g of octane are polymerized in a 100 ml round-bottom flask for 5 hours at 130° C. The solvent and the unreacted monomer are removed by evaporation under high vacuum.

Yield: 21.4 g (99%) of a clear viscous liquid. GPC: Mn=3800 Mw=8600 PD=2.3.

A11) Random Copolymer of Styrene and MAPP 1.67 g (4.6 mmol) of PR 2, 6.0 g (58.1 mmol) of styrene, 13.9 g (58.1 mmol) of MAPP and 10 g of octane are weighed into a 100 ml round-bottom flask. The degassed solution is polymerized for 5 hours at 130° C. and the volatile components are separated off, giving 19.8 g (91%) of oligomer.

GPC: Mn=1300 Mw=1900 PD=1.4.

4. Block Copolymers

A 12) Block Copolymer of APP and 2-Hydroxyethylacrylate

A 100 ml round-bottom flask is charged with 1.44 g (4 mmol) of PR 2, 15 g (66 mmol) of APP and 7.5 g of octane, and this mixture is polymerized for 2.5 hours at 130° C. All volatile components are then removed under vacuum. Yield: 16.2 g (99%). 3.9 g (33 mmol) of 2-hydroxyethylacrylate and 9.5 g of octane are added to this polymer, and this mixture is degassed and polymerized for another 2.5 hours at 130° C. Again, all volatile components are removed under vacuum.

Yield: 20 g (98%); Total yield over both polymerization pocesses: 97%. GPC: Mn=1400 Mw=2100 PD=1.6.

A13) to A16) Block Copolymers:

In analogy to Example A12), the following 4 block copolymers are prepared from equivalent amounts of monomers and 4 mol % of PR 2:

| Example | Monomer 1 | Monomer 2 | Yield | Mn | Mw | PD |
|---|---|---|---|---|---|---|
| A13 | N-butylacrylate | MAPP | 94% | 2000 | 3800 | 1.9 |
| A14 | styrene | APP | 45% | 1200 | 1600 | 1.4 |
| A15 | n-butylacrylate | APP | 92% | 1400 | 2100 | 1.6 |
| A16 | APP | methylmethacrylate | 57% | 1200 | 4300 | 3.5 |

B) Polymerization Examples Using Compounds of Formula (III)

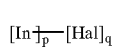

and an Oxidizable Transition Metal Complex Catalyst

In polymerization's B1) and B2), 6 mol % (based on the monomer) of 2-bromo-methylpropionate (Fluka, purum), 3 mol % Cu(I)Br (Fluka, purum) and 3 mol % N,N,N',N'',N''-pentamethyl-diethylentriamine (PMDETA, Fluka, purum) is used.

Homopolymerizations:

B1) Synthesis of Poly(4-methacryloyloxy-1,2,2,6,6-pentamethylpiperidine).

A 100 ml round bottom flask, equipped with magnetic stirrer, reflux condenser and septum is charged with 0.360 g (2.51 mmol) CuBr, 20.0 g (83.56 mmol) 4-methacryloyloxy-1,2,2,6,6-pentamethylpiperidine and 10 g n-octane. While stirring, the mixture is degassed in vacuo and purged with nitrogen 3 times. 0.43 g (2.51 mmol) of the ligand PMDETA is subsequently added via syringe and the mixture heated to 50° C. (oil bath). 0.837 g (5.02 mmol) 2-bromo-methylpropionate (initiator) is subsequently added via syringe and the temperature raised to 80° C. The exothermic polymerization reaction starts and by cooling with ice the temperature is controlled not to exceed 100° C. After 6 h polymerization time, the, the conversion (determined by $^1$H-NMR in CDCl$_3$) is almost quantitative. The reaction mixture is cooled to R.T. diluted with 20 ml ethylacetate, 20 g aluminumoxide(Merck) added, 1 h stirred at R.T and filtered (to adsorb the catalyst). The solvents are subsequently evaporated in a rotary evaporator and the polymer dried in high vacuum at 60° C. over night.

Yield: 19.0 g (95%); GPC (THF): $M_n$=4100, $M_w$=5330, PDI=1.30. (calc: $M_n$=3990.).

B2) Synthesis of Poly(4,6-bis(2,4-dimethylphenyl)-2(2-hydroxy-acryloxyphenyl)-triazine).

A 100 ml round bottom flask, equipped with magnetic stirrer, reflux condenser and septum is charged with 0.191 g (1.33 mmol) CuBr, 20.0 g (44.3 mmol) 4,6-bis(2,4-dimethylphenyl)-2(2-hydroxy-acryloxyphenyl)-triazine and 10 g n-octane. While stirring, the mixture is degassed in vacuo and purged with nitrogen 3 times. 0.23 g (1.33 mmol) of the ligand PMDETA is subsequently added via syringe and the mixture heated to 50° C. (oil bath). 0.444 g (2.66 mmol) 2-bromo-methylpropionate (initiator) is subsequently added via syringe and the temperature raised to 80° C. The exothermic polymerization reaction starts and the temperature reaches almost 100° C. After 6 h polymerization time, the conversion (determined by $^1$H-NMR in CDCl$_3$) is almost quantitative. The reaction mixture is cooled to R.T., diluted with 20 ml ethylacetate, 20 g aluminumoxide (Merck) added, 1 h stirred at R.T and filtered (to adsorb the catalyst). The solvents are subsequently evaporated in a rotary evaporator and the polymer dried in high vacuum at 60° C. over night.

Yield: 19.3 g (97%). GPC (THF): $M_n$=7400, $M_w$=9300, PDI=1.26. (calc: $M_n$=7520.)

B3 ATRP Polymerization of a Benztriazole UV-absorber Methacrylate

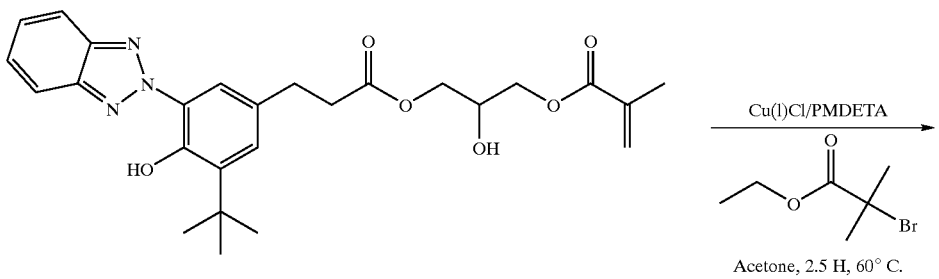

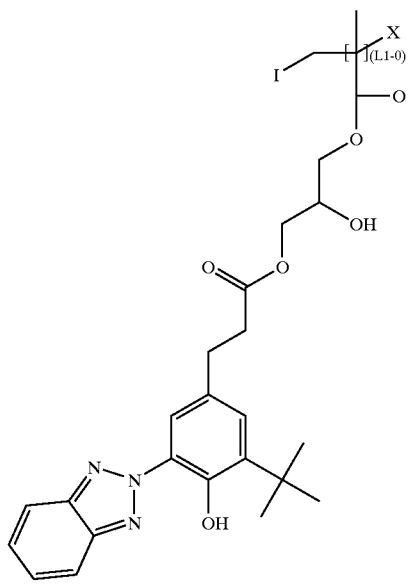

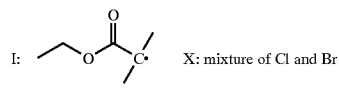

Into a 250 ml 3-necked flask 0.253 g (2.55 mmol) Cu(I)Cl (Fluka purum) and 40.0 g (0.0851 mol) of the monomer were added and the reaction vessel evacuated and purged with $N_2$ 3 times. 40 ml acetone (Fluka purum) was added, the mixture homogenized by magnetic stirring and again evacuated and purged with $N_2$ 3 times. 0.442 g (2.55 mmol) of the ligand pentamethyl-diethylene-triamine (PMDETA, Fluka purum) was added with a syringe via a septum followed by 1.661 g (8.51 mmol) of the initiator, ethyl-α-bromo-isobutyrate (Fluka purum). The homogeneous mixture was heated to 60° C. during 2.5 h. Conversion ($^1$H-NMR): ca. 100%. After cooling, the mixture was diluted with 50 ml ethylacetate, stirred with 2×40 g $Al_2O_3$ and each time filtered (to remove the catalyst). The solvents were evaporated and the macromonomer dried at 100° C. in high vacuum (p<0.1 mbar).

Yield: 34.6 g (83%) slightly yellow powder. Analysis: GPC (THF, PS-standards): $M_n$=6990, $M_w$=8280, PDI=1.18 ($M_n$ (calc.)=4890); EI.-analysis: calc C, 64.04; H, 6.50; N, 8.42; Br, 0.80; found C, 63.70; H, 6.31; N, 8.08; Br, 0.70.

B4 ATRP Polymerization of a Benztriazole UV-absorber Methacrylate (NORBLOC 7966)

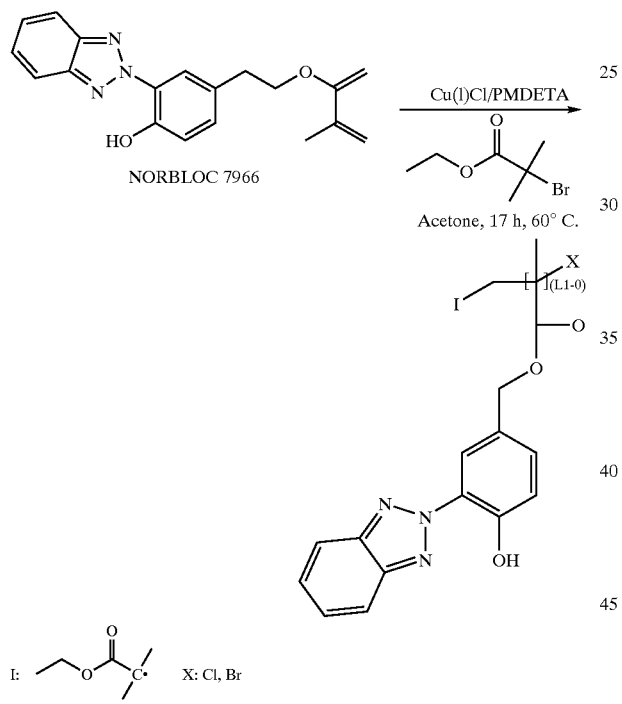

Into a 350 ml 3-necked flask 0.408 g (4.13 mmol) Cu(I)Cl (Fluka purum) and 45.0 g (0.137 mol) of the monomer NORBLOC 7966 were added and the reaction vessel evacuated and purged with $N_2$ 3 times. 125 ml acetone (Fluka purum) was added, the mixture homogenized by magnetic stirring and again evacuated and purged with $N_2$ 3 times. 0.715 g (4.13 mmol) of the ligand pentamethyl-diethylene-triamine (PMDETA, Fluka purum) was added with a syringe via a septum followed by 2.684 g (13.7 mmol) of the initiator, ethyl-α-bromo-isobutyrate (Fluka purum). The homogeneous mixture was heated to 60° C. during 17 h. Conversion ($^1$H-NMR): ca. 100%. After cooling, the mixture was diluted with 200 ml dioxane, stirred with 50 g $Al_2O_3$ for 30 min. and filtered (to remove the catalyst). The polymer was precipitated 3× in 300 ml MeOH, filtered and dried at 40° C. in high vacuum (p<0.1 mbar) for 24 h.

Yield: 39.15 g (82%) yellow powder. Analysis: GPC (THF, PS-standards): $M_n$=4610, $M_w$=5740, PDI=1.24 ($M_n$ (calc.)=3470); EI.-analysis: calc C, 67.39; H, 6.16; N, 12.77; Br, 1.21; found C, 67.40; H, 5.38; N, 12.20; Br, 0.35.

B5 ATRP Copolymerization of a Benztriazole UV-absorber Methacrylate (NORBLOC 7966) With Methyl-methacrylate (MMA)

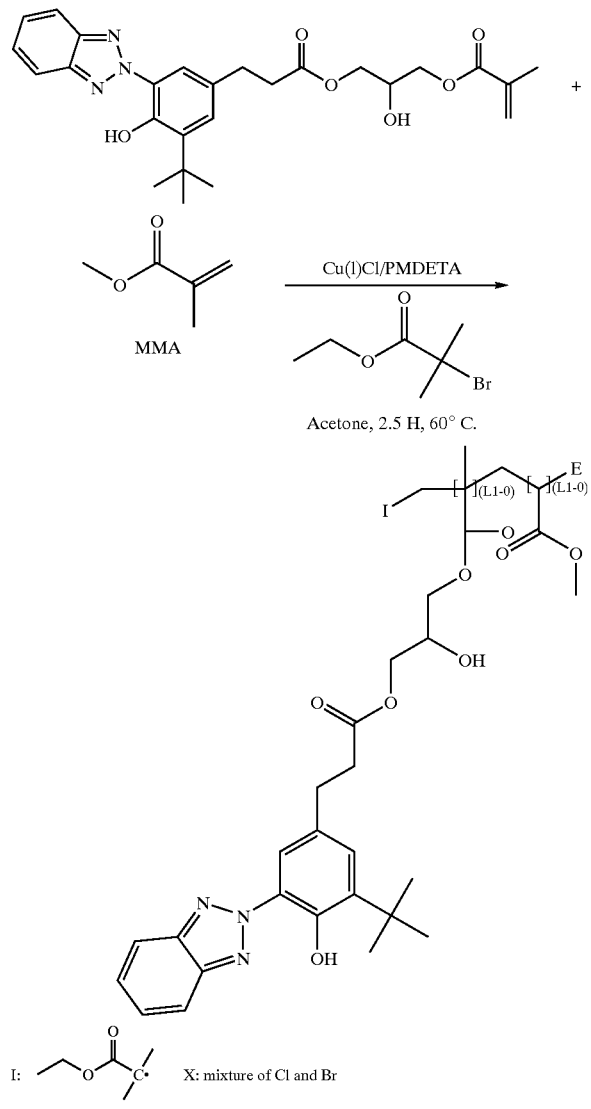

Into a 250 ml 3-necked flask with mechanical stirring 0.215 g (2.18 mmol) Cu(I)Cl (Fluka purum) and 35.0 g (72.6 mmol) of the first monomer (benzotriazol) were added and the reaction vessel evacuated and purged with $N_2$ 3 times. 50 ml acetone (Fluka purum) and 7.277 g (72.6 mmol) methyl-methacrylate (MMA, Fluka purum) were added, the mixture homogenized by mechanical stirring and again evacuated and purged with $N_2$ 3 times. 0.377 g (2.18 mmol) of the ligand pentamethyl-diethylene-triamine (PMDETA, Fluka purum) was added with a syringe via a septum followed by 1.417 g (7.26 mmol) of the initiator, ethyl-α-bromo-isobutyrate (Fluka purum). The homogeneous mixture was heated to 60° C. during 6 h. Conversion ($^1$H-NMR): ca. 100%. After cooling, the mixture was diluted with 60 ml dioxane, stirred with 50 g $Al_2O_3$ for 30 min. and filtered (to remove the catalyst). The polymer was precipitated in 800 ml MeOH/$H_2O$ (1:5) filtered and dried at 40° C. in high vacuum (p<0.1 mbar) for 24 h.

Yield: 35.75 g (81.4%) slightly yellow powder. Analysis: GPC (THF, PS-standards): $M_n$=7430, $M_w$=9930, PDI=1.34

($M_n$ (calc.)=6010); El.-analysis: calc C, 63.37; H, 6.75; N, 7.02. found C, 62.43; H, 6.74; N, 6.75.

C) Application Results

Impact Strength as a Function of Artificial Weathering

Commercially available PE or PP (Hostalen® GM 6255, supplier: Hoechst, $MFR_{(260/21.6)}$=4.55, stabilizer residues: 420 ppm Irganox 1010+1400 ppm Irgafos 168; Profax® 6501, supplier: Montell, $MFR_{(230/2.16)}$=566, stabilizer residues: 45 ppm Irganox 1076) is extruded together with the compounds given in Table 1 on a twin screw extruder (TW 100, Haake) at 225–240° C. (heating zones 1–5) and 30 rpm.

The granulated polymer is injection molded at 240° C. (A 221-75-350, Arburg) to test samples. The tensile impact strength of these test samples is determined as a function of artificial weathering.

The weatherings are carried out in a Weather-O-Meter (Cl 65A, Atlas; black. panel temperature=63° C., relative humidity=60%, water spray). The compositions and test results are shown in Table 2 and 3. The higher the impact strength value, the more stable the tested composition

TABLE 2

Artificial weathering of PE

Tensile impact strength [kJ/m2]

| Example | Additives | 0 h | 500 h | 1000 h | 1500 h | 2000 h | 3000 h |
|---|---|---|---|---|---|---|---|
| C1 | without | 835 | 143 | 52 | 49 | 41 | 41 |
| C2 | 0.2% Tinuvin 326 | 880 | 941 | 902 | 510 | 461 | 394 |
| C3 | 0.2% Chimassorb 944 | 946 | 948 | 688 | 529 | 435 | 52 |
| C4 | 0.2% polymer of example A5 | 884 | 896 | 847 | 716 | 667 | 547 |
| C5 | 0.2% polymer of example A8 | 989 | 950 | 1016 | 893 | 958 | 792 |

TABLE 3

Artificial weathering of PP

Tensile impact strength [kJ/m2]

| Example | Additives | 0 h | 500 h | 1000 h | 1500 h | 2000 h | 3000 h |
|---|---|---|---|---|---|---|---|
| C6 | 0.2% Irganox B225 0.05% Ca-stearate | 458 | 41 | 41 | 41 | 41 | 41 |
| C7 | 0.2% Irganox B225 0.05% Ca-stearate 0.2% Tinuvin 622 | 458 | 487 | 436 | 195 | 82 | 44 |
| C8 | 0.2% Irganox B225 0.05% Ca-stearate 0.2% Tinuvin 326 | 479 | 536 | 281 | 208 | 173 | 140 |
| C9 | 0.2% Irganox B225 0.05% Ca-stearate 0.2% Chimassorb 944 | 435 | 465 | 385 | 376 | 309 | 94 |
| C10 | 0.2% Irganox B225 0.05% Ca-stearate 0.4% polymer of example A15* | 448 | 440 | 431 | 369 | 327 | 205 |

*block copolymer with equal block lengths (0.4% additive ≈ 0.2% stabilizer content)

The values obtained show that the samples containing the oligomeric compounds stabilize the polymer more effectively when aged over a prolonged period of time than the samples containing the conventional stabilizers.

What is claimed is:

1. A polymerizable composition, comprising a) at least one compound of formula (I)

(RG)—A—(Stab)　　(I)

wherein (Stab) is a light stabilizer radical selected from the group consisting of sterically hindered amines, hydroxyphenyl-s-triazines, hydroxyphenyl-benzotriazols and o-hydroxy-benzophenones;

A is a spacer group or a direct bond; and (RG) is a group containing at least one ethylenically unsaturated functional group;

and a compound selected from the group consisting of b1) a compound of formula (II)

Y—X　　(II)

which contains a structural element>N—O—X where the nitrogen atom is part of a cyclic ring system or is substituted to form an acyclic structure, and wherein X represents a group having at least one carbon atom and is such that the free radical derived from X is capable of initiating polymerization;

and a compound selected from the group consisting of b2) a stable free radical having a structural element>N—O· where the nitrogen atom is part of a cyclic ring system or is substituted to form an acyclic structure and a free radical source from which a radical is formed capable of initiating polymerization;

b3) a compound of formula (III)

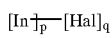
(III)

and a catalytically effective amount of an oxidizable transition metal complex catalyst where the transition metal is present as a transition metal complex ion in the lower oxidation state of a redox system;

wherein

[In] represents a polymerization initiator fragment of a polymerization initiator of formula (III) capable of initiating polymerization of monomers or oligomers, which polymerization initiator is selected from the group consisting of $C_1$–$C_8$-alkyl halides, $C_6$–$C_{15}$-aralkylhalides, $C_2$–$C_8$ α-haloalkyl esters, arene sulfonyl chlorides, haloalkanenitriles, α-haloacrylates and halolactones;

p and q represent one; and

-[Hal] represents a leaving group;

and optionally c) one or more ethylenically unsaturated monomers or oligomers different from those of formula (I).

2. A composition according to claim 1, wherein the compound of formula (I) is a compound of formulae (Ia), (Ib), (Ic), (Id), (Ie), (If), (Ig), (Ih), (Ii) or (Ij)

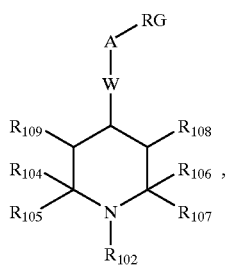
(Ia)

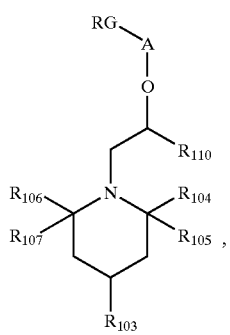
(Ib)

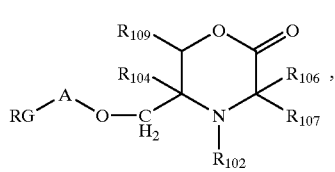
(Ic)

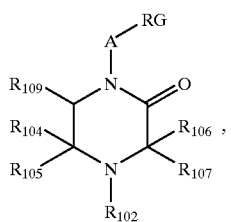
(Id)

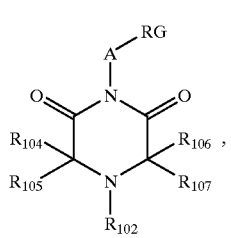
(Ie)

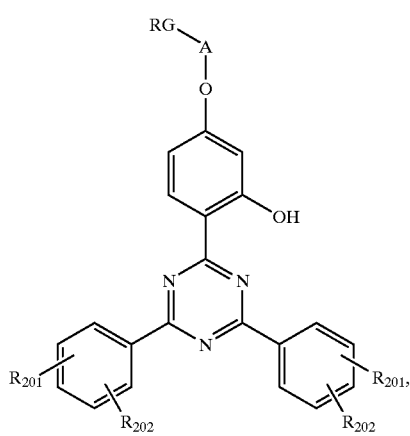
(If)

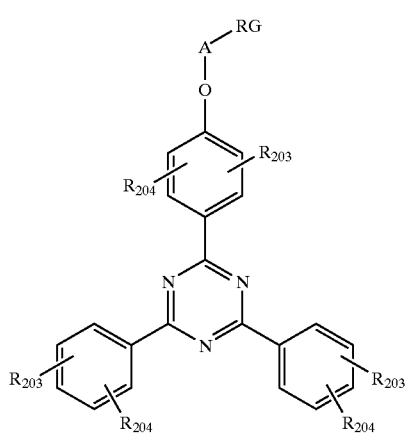
(Ig)

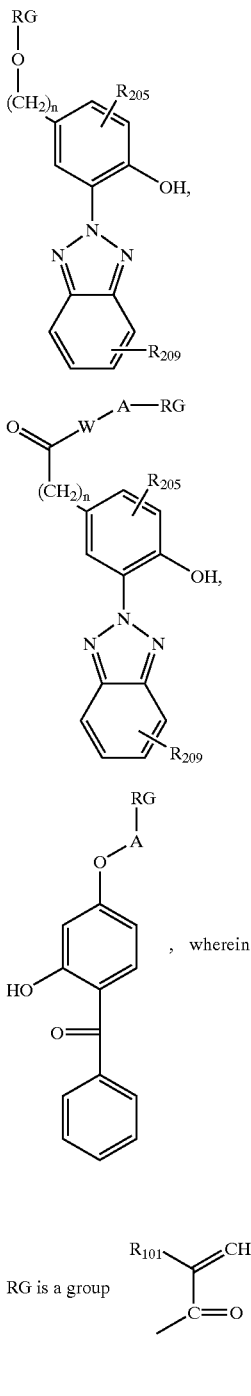

W is O or $NR_{110}$;

A is a direct bond, $-(C_2-C_{12})$alkylene-W—, $-(C_3-C_{12})$ alkenylene-W—, $-CH_2-HC(OH)-CH_2-W-$, $-(C_3-C_{12})$alkinylene-W—, $(C_5-C_{12})$cycloalkylene-W—, $-(C_2-C_{12})$alkylene-W— interrupted by at least one oxygen or nitrogen atom or a group $-CH_2-CHR_{110}-W-$, a group $-CHR_{111}-COOP$ wherein P is $-(CH_2-HC_{112})_n-$ or a group $-CH_2-HC(OH)-CH_2-$, wherein $R_{100}$, $R_{111}$, $R_{112}$ and n are as defined below;

$R_{101}$ is H or methyl $R_{102}$ is hydrogen, OH, $C_1-C_{18}$alkyl, $C_3-C_8$alkenyl, $C_3-C_8$alkynyl, $C_7-C_{12}$aralkyl, $C_1-C_{18}$alkanoyl, $C_3-C_{18}$alkenoyl, $C_1-C_{18}$alkanoyloxy, glycidyl, $C_1-C_{18}$alkoxy, $C_5-C_{12}$cycloalkyl, $C_5-C_{12}$cycloalkoxy or a group $-CH_2CHR_{110}(OH)$;

$R_{103}$ is H, OH, $NH_2$, $C_1-C_{18}$alkoxy, $C_1-C_{18}$alkanoyloxy, $C_6-C_{18}$aryloyloxy, $C_1-C_{18}$alkanoylamino, $C_1-C_{18}$alkylamino, $C_1-C_{18}$dialkylamino, benzyloxy or together with the linking carbon atom forms a $C_5-C_6$cycloalkyl radical or a $C_5-C_6$heterocycloalkyl radical containing one or two oxygen or nitrogen atoms;

$R_{104}$, $R_{105}$, $R_{106}$, $R_{107}$ are independently $C_1-C_8$alkyl or $C_5-C_{12}$cycloalkyl, or $R_{104}$ and $R_{105}$ and/or $R_{106}$ and $R_{107}$ together with the carbon atom to which they are attached form a $C_5-C_{12}$cycloalkyl group;

$R_{108}$ and $R_{109}$ independently are H, $C_1-C_8$alkyl or phenyl;

$R_{110}$ is hydrogen, $C_1-C_{18}$alkyl or phenyl;

$R_{111}$ is hydrogen or $C_1-C_{12}$alky;

$R_{112}$ is hydrogen or methyl;

$R_{201}$ and $R_{202}$ are independently H, OH, CN, $C_1-C_{18}$alkyl, $C_1-C_{18}$alkoxy, halogen, $C_1-C_{18}$alkanoyl, $C_1-C_{18}$alkanoyloxy, $C_1-C_{18}$alkanoylamino, or phenyl which is unsubstituted or substituted with halogen, OH, CN, $NO_2$, $C_1-C_{18}$alkyl, $C_1-C_{18}$alkoxy or a group $-O-CH_2-HC(OH)-CH_2-OR_{206}$;

$R_{203}$ and $R_{204}$ are independently H, OH, CN, $C_1-C_{18}$alkyl, $C_1-C_{18}$alkoxy, halogen, $C_1-C_{18}$alkanoyl, $C_1-C_{18}$alkanoyloxy, $C_1-C_{18}$alkanoylamino, or phenyl which is unsubstituted or substituted with halogen, OH, CN, $NO_2$, $C_1-C_{18}$alkyl, $C_1-C_{18}$alkoxy or a group $-O-CH_2-HC(OH)-CH_2-OR_{206}$ with the proviso that at least one of both is OH;

$R_{205}$ is H, halogen, phenyl, $C_1-C_{18}$alkyl, $C_5-C_{12}$cycloalkyl, $C_7-C_{12}$aralkyl or a group $-SR_{208}$, $-SO_2R_{208}$, $-COOR_{208}$ or $PO(OR_{208})_2$;

$R_{206}$ is $C_1-C_{18}$alkyl, $C_3-C_{18}$alkyl interrupted by at least one oxygen atom, phenyl which is unsubstituted or substituted with halogen, OH, CN, $NO_2$, $C_1-C_{18}$alkyl, $C_1-C_{18}$alkoxy, $C_5-C_6$cycloalkyl which is unsubstituted or substitueted by $C_1-C_4$alkyl or a group $-C(O)R_{207}$;

$R_{207}$ $C_1-C_{18}$alkyl or phenyl which is unsubstituted or substituted with halogen, OH, CN, $NO_2$, $C_1-C_{18}$alkyl or $C_1-C_{18}$alkoxy;

$R_{208}$ is $C_1-C_{18}$alkyl, $C_5-C_6$cycloalkyl or phenyl;

$R_{209}$ is H, halogen, phenyl, $C_1-C_{18}$alkyl, $C_5-C_{12}$cycloalkyl, $C_7-C_{12}$aralkyl or a group $-SR_{208}$, $-SO_2R_{208}$, $-COOR_{208}$ or $PO(OR_{208})_2$;

n is a number from 0 to 12; and k is a number from 0 to 12.

3. A composition according to claim 2, wherein $R_{108}$ and $R_{109}$ are hydrogen and the other substituents are as defined in claim 2.

4. A composition according to claim 2, wherein in the compounds of formulae (Ia), (Ib), (Ic), (Id) and (Ie) $R_{104}$, $R_{105}$, $R_{106}$ and $R_{107}$ are methyl and the other substituents are as defined in claim 2.

5. A composition according to claim 2, wherein A is a direct bond, $-(C_2-C_6)$alkylene-W—, $-(C_2-C_{12})$alkylene-W— interrupted by at least one oxygen or nitrogen atom or a group $-CH_2-CHCH_3-W-$.

6. A composition according to claim 2, wherein $R_{102}$ is hydrogen, $C_1-C_8$alkyl, allyl, benzyl, $C_1-C_8$alkanoyl, $C_1-C_8$alkanoyloxy, $C_1-C_8$alkoxy or cyclohexyloxy.

7. A composition according to claim 2, wherein the compound of formula (I) is a compound of formulae (Ia), (Ic), (Id), (If), (Ig), (Ii) or I(j).

8. A composition according to claim 1, wherein in the compound of formula (Ia),

A is a direct bond;

W is an oxygen atom;

RG is a group

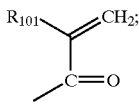

$R_{101}$ is H or methyl; $R_{102}$ is H or $C_1$–$C_4$alkyl; $R_{104}$–$R_{107}$ are methyl; and $R_{108}$ and $R_{109}$ are hydrogen.

9. A composition according to claim 1, wherein in the compound of formula (Ii)

A is a direct bond

W is an oxygen atom;

RG is a group

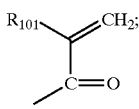

$R_{101}$ is H or methyl;

$R_{205}$ is H $C_1$–$C_8$alkyl, phenyl or α-cumyl;

$R_{209}$ is H or Cl and k is a number from 1 to 8.

10. A composition according to claim 1, wherein the ethylenically unsaturated monomer or oligomer c) is selected from the group consisting of alkene, styrene, substituted styrene, conjugated dienes, acrolein, vinyl acetate, (alkyl)acrylic acidanhydrides, (alkyl)acrylic acid salts, (alkyl)acrylic esters or (alkyl)acrylamides.

11. A composition according to claim 10, wherein the ethylenically unsaturated monomer is styrene, methylacrylate, ethylacrylate, butylacrylate, isobutylacrylate, tert. butylacrylate, hydroxyethylacrylate, hydroxypropylacrylate, dimethylaminoethylacrylate, glycidylacrylates, methyl(meth)acrylate, ethyl(meth)acrylate, butyl(meth)acrylate, hydroxyethyl(meth)acrylate, hydroxypropyl(meth)acrylate, dimrethylaminoethyl(meth)acrylate, glycidyl(meth)acrylates, acrylonitrile, acrylamide or methacrylamide.

12. A composition according to claim 1 wherein the structural element

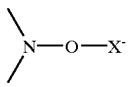

is a 1-alkoxy-polyalkyl-piperidine derivative containing a structural element of formula (X)

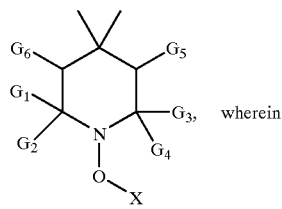

(X)

wherein $G_1$, $G_2$, $G_3$, $G_4$ are independently $C_1$–$C_6$alkyl with the proviso that at least one is not methyl or $G_1$ and $G_2$ or $G_3$ and $G_4$, or $G_1$ and $G_2$ and $G_3$ and $G_4$ together form a $C_5$–$C_{12}$cycloalkyl group;

$G_5$, $G_6$ independently are H, $C_1$–$C_{18}$alkyl, phenyl, naphthyl or a group COO$C_1$–$C_{18}$alkyl and X represents a group having at least one carbon atom and is such that the free radical X· derived from X is capable of initiating polymerization of ethylenically unsaturated monomers.

13. A composition according to claim 1, wherein the compound containing a structural element

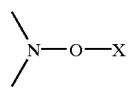

is of formula (Xa) or (Xb)

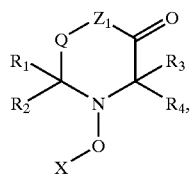

(Xa)

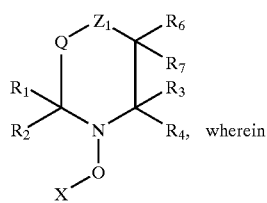

(Xb)

wherein $R_1$, $R_2$, $R_3$ and $R_4$ independently of each other are $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl or $R_1$ and $R_2$ and/or $R_3$ and $R_4$ together with the linking carbon atom form a $C_3$–$C_{12}$cycloalkyl radical;

$R_5$, $R_6$ and $R_7$ independently are hydrogen, $C_1$–$C_{18}$alkyl or $C_6$–$C_{10}$aryl;

X represents a group having at least one carbon atom and is such that the free radical X· derived from X is capable of initiating polymerization of ethylenically unsaturated monomers;

$Z_1$ is O or $NR_8$;

$R_8$ is hydrogen, OH, $C_1$–$C_{18}$alkyl, $C_3$–$C_{18}$alkenyl, $C_3$–$C_{18}$alkinyl, $C_1$–$C_{18}$alkyl, $C_3$–$C_{18}$alkenyl, $C_3$–$C_{18}$alkinyl which are substituted by one or more OH, halogen or a group —O—C(O)—$R_5$, $C_2$–$C_{18}$alkyl which is interrupted by at least one O atom and/or $NR_5$ group, $C_3$–$C_{12}$cycloalkyl or $C_6$–$C_{10}$aryl, $C_7$–$C_9$phenylalkyl, $C_5$–$C_{10}$heteroaryl, —C(O)—$C_1$–$C_{18}$alkyl, —O—$C_1$–$C_{18}$alkyl or —COO$C_1$–$C_{18}$alkyl;

Q is a direct bond or a divalent radical $CR_9R_{10}$, $CR_9R_{10}$—$CR_{11}R_{12}$, $CR_9R_{10}CR_{11}R_{12}CR_{13}R_{14}$, C(O) or $CR_9R_{10}$C(O), wherein $R_9$, $R_{10}$, $R_{11}$, $R_{12}$, $R_{13}$ and $R_{14}$ are independently hydrogen, phenyl or $C_1$–$C_{18}$alkyl.

14. A composition according to claim 1, wherein X is selected from the group consisting of —$CH_2$-aryl,

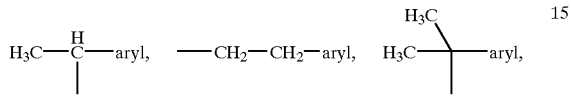

$(CH_3)_2$C-aryl, $(C_5$–$C_6$cycloalkyl$)_2$CCN, $(C_1$–$C_{12}$alkyl$)_2$CCN, —$CH_2CH=CH_2$, $(C_1$–$C_{12})$alkyl-$CR_{20}$—C(O)—$(C_1$–$C_{12}$alkyl, $(C_1$–$C_{12})$alkyl-$CR_{20}$—C(O)—$(C_6$–ClO)aryl, $(C_1$–$C_{12})$alkyl-$CR_{20}$—C(O)—$(C_1$–$C_{12})$alkoxy, $(C_1$–$C_{12})$alkyl-$CR_{20}$—C(O)-phenoxy, $(C_1$–$C_{12})$alkyl-$CR_{20}$—C(O)—N-di$(C_1$–$C_{12})$alkyl, $(C_1$–$C_{12})$alkyl-$CR_{20}$—CO—NH$(C_1$–$C_{12})$alkyl, $(C_1$–$C_{12})$alkyl-$CR_{20}$—CO—$NH_2$, —$CH_2CH=CH$—$CH_3$, —$CH_2$—C$(CH_3)=CH_2$, —$CH_2$—CH=CH-phenyl,

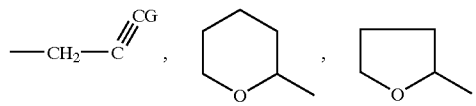

wherein $R_{20}$ is hydrogen or $C_1$–$C_{12}$alkyl, the aryl groups are unsubstituted or substituted with $C_1$–$C_{12}$alkyl, halogen, $C_1$–$C_{12}$alkoxy, $C_1$–$C_{12}$alkylcarbonyl, glycidyloxy, OH, —COOH or —COO$C_1$–$C_{12}$alkyl.

15. A composition according to claim 14, wherein X is selected from the group consisting of —$CH_2$-phenyl, —$CH_3$CH-phenyl, $(CH_3)_2$C-phenyl, $(C_5$–$C_6$cycloalkyl$)_2$CCN, $(CH_3)_2$CCN, —$CH_2CH=CH_2$, $CH_3CH$—CH=$CH_2$, $(C_1$–$C_4$alkyl$)CR_{20}$—C(O)-phenyl, $(C_1$–$C_4$)alkyl-$CR_{20}$—C(O)—$(C_1$–$C_4$)alkoxy, $(C_1$–$C_4$)alkyl-$CR_{20}$—C(O)—$(C_1$–$C_4$)alkyl, $(C_1$–$C_4$)alkyl-$CR_{20}$—C(O)—N-di$(C_1$–$C_4$)alkyl, $(C_1$–$C_4$)alkyl-$CR_{20}$—C(O)—NH$(C_1$–$C_4$)alkyl, $(C_1$–$C_4$)alkyl-$CR_{20}$—C(O)—$NH_2$, wherein $R_{20}$ is hydrogen or $(C_1$–$C_4$)alkyl.

16. A composition according to claim 1, wherein the transition metal complex ion is a Cu(I) complex ion in the Cu(I)/Cu(II) system.

17. A process for preparing an oligomer, cooligomer, polymer or copolymer with a polydispersity $M_w/M_n$ between 1 and 3, which process comprises reacting a composition of a) at least one compound of formula (I)

(RG)—A—(Stab)      (I)

wherein (Stab) is a light stabilizer radical selected from the group consisting of sterically hindered amines, hydroxyphenyl-s-triazines, hydroxyphenyl-benzotriazols and o-hydroxy-benzophenones;

A is a spacer group or a direct bond; and (RG) is a group containing at least one ethylenically unsaturated functional group; and a compound selected from the group consisting of b1) a compound of formula (II)

which compound contains a structural element>N—O—X where the nitrogen atom is part of a cyclic ring system or is substituted to form an acyclic structure, and wherein X represents a group having at least one carbon atom and is such that the free radical derived from X is capable of initiating polymerization;

b2) a stable free radical having a structural element>N—O· where the nitrogen atom is part of a cyclic ring system or is substituted to form an acyclic structure and a free radical source from which a radical is formed capable of initiating polymerization;

b3) a compound of formula (III)

a catalytically effective amount of an oxidizable transition metal complex catalyst, where the transition metal is present as a transition metal complex ion in the lower oxidation state of a redox system;

wherein

[In] represents a polymerization initiator fragment of a polymerization initiator of formula (III) capable of initiating polymerization of monomers or oligomers, which polymerization initiator is selected from the group consisting of $C_1$–$C_8$-alkyl halides, $C_6$–$C_{15}$-aralkylhalides, $C_2$–$C_8$α-haloalkyl esters, arene sulfonyl chlorides, haloalkanenitriles, α-haloacrylates and halolactones;

p and q represent one; and

-[Hal] represents a leaving group; and optionally simultaneously or in a subsequent step with c) one or more ethylenically unsaturated monomers or oligomers different from those of formula (I), at a temperature between 50° C. and 180° C.

18. A process according to claim 17, wherein the molecular weight $M_n$ of the polymer copolymer, oligomer or cooligomer is between 1000 and 100 000.

19. A process according to claim 17, wherein the polydispersity is from 1.0 to 2.

20. A oligomer, polymer, cooligomer or copolymer obtained according to the process of claim 17.

21. An organic material stabilized against heat, actinic or electromagnetic radiation ranging from γ to infrared with a oligomer, polymer, cooligomer or copolymer obtained according to the process of claim 17.

* * * * *

UNITED STATES PATENT AND TRADEMARK OFFICE
CERTIFICATE OF CORRECTION

PATENT NO. : 6,583,245 B1
DATED : June 24, 2003
INVENTOR(S) : Alfred Steinmann et al.

It is certified that error appears in the above-identified patent and that said Letters Patent is hereby corrected as shown below:

<u>Title page,</u>
Item [30], should read:
-- [30] Foreign Application Priority Data
      Dec. 23, 1998   (EP) ........................... 98811259.5 --.

Signed and Sealed this

Thirtieth Day of September, 2003

JAMES E. ROGAN
*Director of the United States Patent and Trademark Office*